US007213673B2

(12) United States Patent
Shabana et al.

(10) Patent No.: US 7,213,673 B2
(45) Date of Patent: May 8, 2007

(54) RECONFIGURABLE BY-WIRE FOOT PEDALS

(75) Inventors: Mohsen D. Shabana, Ann Arbor, MI (US); Christopher E. Borroni-Bird, Oakland Township, MI (US); Adrian B. Chernoff, Royal Oak, MI (US); Robert Louis Vitale, Macomb Township, MI (US)

(73) Assignee: General Motors Corporation, Detriot, MI (US)

( * ) Notice: Subject to any disclaimer, the term of this patent is extended or adjusted under 35 U.S.C. 154(b) by 321 days.

(21) Appl. No.: 10/626,509

(22) Filed: Jul. 24, 2003

(65) Prior Publication Data

US 2004/0129487 A1 Jul. 8, 2004

Related U.S. Application Data

(60) Provisional application No. 60/398,745, filed on Jul. 26, 2002.

(51) Int. Cl.
*B60K 26/00* (2006.01)

(52) U.S. Cl. ........................ 180/334; 180/335; 74/512; 74/513; 74/514; 74/560; 74/594.7

(58) Field of Classification Search ................ 180/315, 180/334, 335; 74/512, 513, 514, 560, 562, 74/594.7
See application file for complete search history.

(56) References Cited

U.S. PATENT DOCUMENTS

| | | | | |
|---|---|---|---|---|
| 826,862 A | | 7/1906 | Little | |
| 1,316,180 A | | 9/1919 | Peden | |
| 1,384,251 A | | 7/1921 | Gellman | |
| 1,474,950 A | | 11/1923 | Thole | |
| 2,032,157 A | | 2/1936 | Van Dresser et al. | 296/75 |
| 2,202,857 A | | 1/1940 | Jacobs | 296/75 |
| 2,747,924 A | | 5/1956 | Walther | 296/75 |
| 2,843,870 A | | 7/1958 | Perry | 15/237 |
| 2,862,761 A | | 12/1958 | Scheidegger | 296/75 |
| 2,910,888 A | | 11/1959 | Bergsten | 74/564 |
| 3,059,960 A | | 10/1962 | Komorowski et al. | 296/65 |
| 3,837,238 A | | 9/1974 | Walsh | 74/526 |
| 4,683,977 A | | 8/1987 | Salmon | 180/334 |
| 4,702,713 A | * | 10/1987 | Lee | 440/7 |
| 4,870,871 A | | 10/1989 | Ivan | 74/513 |
| 4,984,838 A | | 1/1991 | Kim | 296/75 |

(Continued)

FOREIGN PATENT DOCUMENTS

| | | | |
|---|---|---|---|
| EP | 50929 A1 | * | 5/1982 |

(Continued)

*Primary Examiner*—Eric Culbreth
(74) *Attorney, Agent, or Firm*—Kathryn A. Marra

(57) ABSTRACT

A vehicle chassis having substantially all of the mechanical, electrical and structural componentry necessary for a fully functional vehicle, including at least energy conversion system, a steering system and a braking system. The chassis is configured for releasable engagement with a variety of different types or styles of vehicle bodies. Various prior art mechanical control linkages between a driver and controlled systems are replaced with non-mechanical control signal transmission components. Fuel cell technology is also implemented. A system for adjustable, reconfigurable foot pedals is also shown for generating driver input to the by-wire braking systems and energy conversion systems and for providing control and comfort for the driver and/or a passenger.

7 Claims, 17 Drawing Sheets

U.S. PATENT DOCUMENTS

| | | | | | |
|---|---|---|---|---|---|
| 5,183,308 | A | | 2/1993 | Koga et al. | 296/75 |
| 5,241,936 | A | * | 9/1993 | Byler et al. | 123/399 |
| 5,309,361 | A | * | 5/1994 | Drott et al. | 701/1 |
| 5,393,082 | A | | 2/1995 | Fenley | 280/291 |
| 5,398,570 | A | * | 3/1995 | Chae | 74/563 |
| 5,588,338 | A | | 12/1996 | Carr et al. | 74/560 |
| 6,289,763 | B1 | | 9/2001 | Rixon et al. | 74/514 |
| 6,295,890 | B2 | | 10/2001 | Rixon et al. | 74/512 |
| 6,298,748 | B1 | | 10/2001 | Rixon et al. | 74/512 |
| 6,318,785 | B1 | | 11/2001 | Tousignant | 296/75 |
| 6,364,047 | B1 | * | 4/2002 | Bortolon | 180/334 |
| 6,431,304 | B1 | * | 8/2002 | Smythe | 180/334 |
| 6,591,711 | B2 | * | 7/2003 | Porter et al. | 74/512 |
| 6,820,895 | B2 | * | 11/2004 | Levine | 280/735 |
| 6,862,950 | B2 | * | 3/2005 | O'Neill | 74/512 |
| 6,962,094 | B2 | * | 11/2005 | Porter et al. | 74/512 |

FOREIGN PATENT DOCUMENTS

| | | | | |
|---|---|---|---|---|
| GB | 2243294 | A | * | 10/1991 |
| JP | 08043266 | A | * | 2/1996 |

* cited by examiner

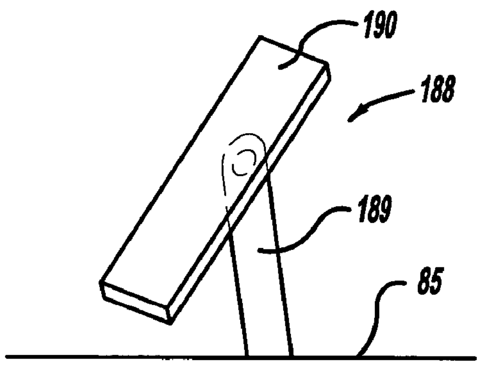
Figure - 14
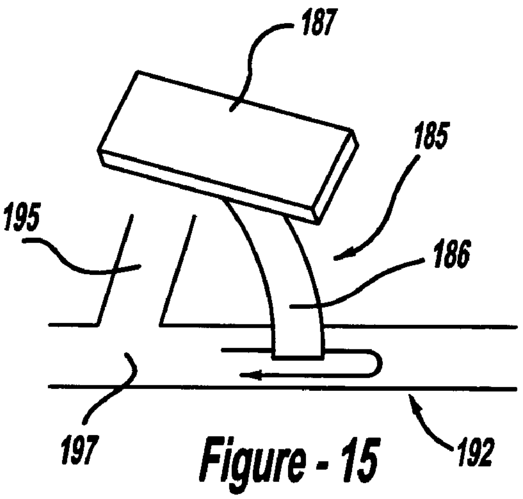
Figure - 15
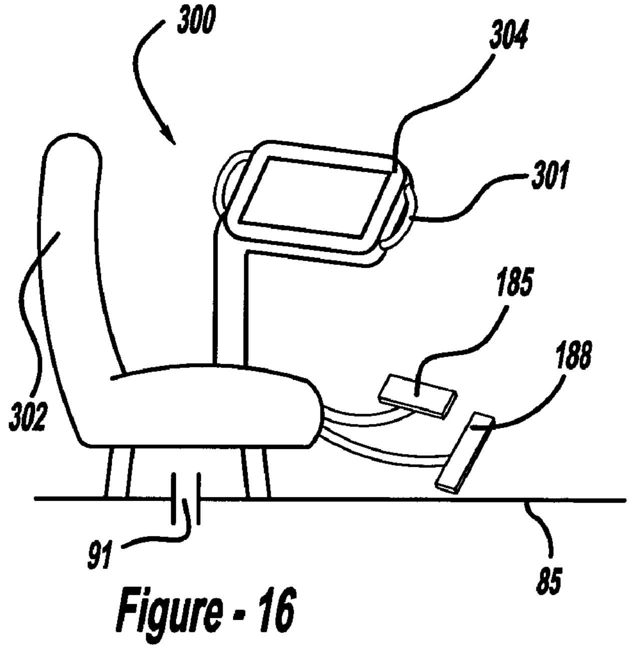
Figure - 16
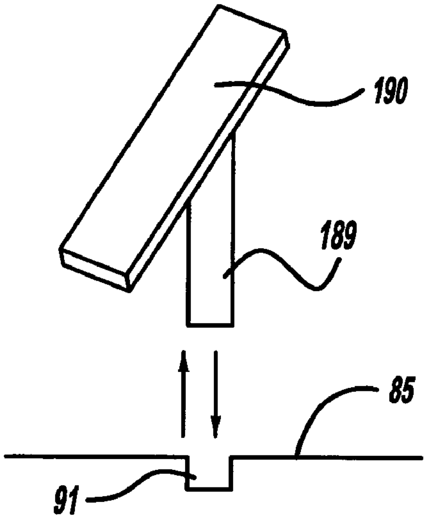
Figure - 17
Figure - 18
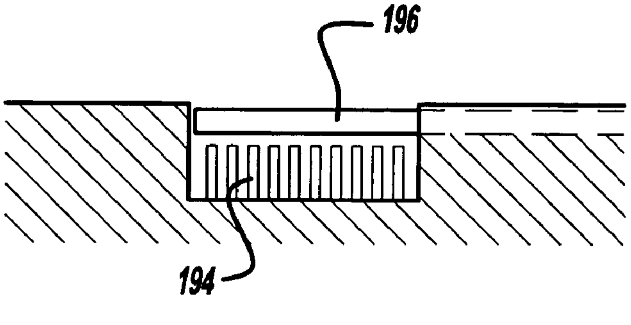

RECONFIGURABLE BY-WIRE FOOT PEDALS

This application claims priority of U.S. Provisional Application Ser. No. 60/398,745 filed Jul. 26, 2002.

TECHNICAL FIELD

The present invention relates to control foot pedals for use with wireless technology and more particularly to adjustable foot pedals for use with brake-by-wire and throttle-by-wire technology.

BACKGROUND OF THE INVENTION

Mobility, being capable of moving from place to place or of moving quickly from one state to another, has been one of the ultimate goals of humanity throughout recorded history. The automobile has likely done more in helping individuals achieve that goal than any other development. Since its inception, societies around the globe have experienced rates of change in their manner of living that are directly related to the percentage of motor vehicle owners among the population.

Prior art automobiles and light trucks include a body, the function of which is to contain and protect passengers and their belongings. Bodies are connected to the numerous mechanical, electrical and structural components that, in combination with a body, comprise a fully functional vehicle. The nature of the prior art connections between a vehicle body and vehicular componentry may result in certain inefficiencies in the design, manufacture and use of vehicles. Three characteristics of prior art body connections that significantly contribute to these inefficiencies are the quantity of connections, the mechanical nature of many of the connections, and the locations of the connections on the body and on the componentry.

In the prior art, the connections between a body and componentry are numerous. Each connection involves at least one assembly step when a vehicle is assembled; it is therefore desirable to reduce the number of connections to increase assembly efficiency. The connections between a prior art body and prior art vehicular componentry include multiple load-bearing connectors to physically fasten the body to the other components, such as bolts and brackets; electrical connectors to transmit electric energy to the body from electricity-generating components and to transmit data from sensors that monitor the status of the componentry; mechanical control linkages, such as the steering column, throttle cable, and transmission selector; and ductwork and hoses to convey fluids such as heated and cooled air from HVAC unit to the body for the comfort of passengers.

Many of the connections in the prior art, particularly those connections that transmit control signals, are mechanical linkages. For example, to control the direction of the vehicle, a driver sends control signals to the steering system via a steering column. Mechanical linkages result in inefficiencies, in part because different driver locations in different vehicles require different mechanical linkage dimensions and packaging. Thus, new or different bodies often cannot use "off-the-shelf" components and linkages. Componentry for one vehicle body configuration is typically not compatible for use with other vehicle body configurations. Furthermore, if a manufacturer changes the design of a body, a change in the design of the mechanical linkage and the component to which it is attached may be required. The change in design of the linkages and components requires modifications to the tooling that produces the linkages and components.

The location of the connections on prior art vehicle bodies and componentry also results in inefficiencies. In prior art body-on-frame architecture, connection locations on the body are often not exposed to an exterior face of the body, and are distant from corresponding connections on the componentry; therefore, long connectors such as wiring harnesses and cables must be routed throughout the body from componentry. The vehicle body of a fully-assembled prior art vehicle is intertwined with the componentry and the connection devices, rendering separation of the body from its componentry difficult and labor-intensive, if not impossible. The use of long connectors increases the number of assembly steps required to attach a vehicle to its componentry.

Furthermore, prior art vehicles typically have internal combustion engines that have a height that is significant proportion of the overall vehicle height. Prior art vehicles bodies are therefore designed with an engine compartment that occupies about a third of the front (or sometimes the rear) of the body length. Compatibility between an engine and a vehicle body requires that the engine fit within the body's engine compartment without physical part interference. Moreover, compatibility between a prior art chassis with an internal combustion engine and a vehicle body requires that the body have an engine compartment located such that physical part interference is avoided. For example, a vehicle body with an engine compartment in the rear is not compatible with a chassis with an engine in the front.

In particular, vehicles of the prior art contain complex mechanical and hydraulic connections for transmitting braking and acceleration input from brake and acceleration pedals to the appropriate mechanical components. However, it is also known that by-wire technology is possible in which the driver input from the foot pedals can be transmitted electronically or electromagnetically rather than mechanically to the electrical and mechanical systems responsible for executing the desired braking or acceleration.

It is also known in the prior art to have adjustable brake and accelerator pedals that are moved forwardly and rearwardly, and in some cases simultaneously moved somewhat upward and downward to accommodate various sizes of vehicle occupants. However, the movement of these pedals is rather limited to localize movement in front of a driver's seat that remains in the same lateral position relative to the vehicle and can only slightly be adjusted in the longitudinal vehicle direction. These prior art pedals are also limited in movement since they are typically mechanical linkages. Mechanical linkages result in inefficiencies, in part, because different driver locations in different vehicles require different mechanical linkage dimensions and packaging.

Common practice in vehicle design also provides a floorboard to support a seat or seats for the driver and passenger. The floor board extends into an inclined toe board or dashboard and an upright fire wall behind the motor compartment. The toe board locates the foot operated controls such as clutch and brake pedals for the driver and is frequently configured with a fixed foot pad to rest the driver's left foot. The inclined toe board provides a rest for the passenger's feet.

SUMMARY OF THE INVENTION

This invention provides a by-wire foot pedal system wherein at least one foot pedal is adjustably mounted in a vehicle, the foot pedals being movable along a track.

The invention is also a by-wire foot pedal system wherein at least one foot pedal is removably mounted in a vehicle for reconfiguration of the driving location, wherein the vehicle includes a plurality of interface points to which the foot pedal is connectable. The foot pedal may be connected to a vehicle seat or to a vehicle console.

The invention is also a by-wire foot pedal system wherein at least one foot pedal is adjustably mounted in a vehicle, the foot pedal being movable laterally within the vehicle body.

The invention is also a method of selling a new OEM vehicle to an end user consumer comprising the steps of: selling the vehicle seats completely independent of the body and chassis. Such a method of selling permits the body of the vehicle and the chassis to be sold to the end consumer independently of each other, the foot pedals then being adjustable to adapt the body to the consumer.

Accordingly, this invention provides a vehicle with a vehicle seat and a driver control unit comprising: a vehicle seat; and a driver interface panel which is reconfigurable for a variety of functions selected from the group consisting of driving, entertainment, child care, etc. Such an invention provides for the unit to be removably mounted at numerous locations or driving positions within the vehicle.

This invention also provides an improved foot rest which is adjustable for comfort in addition to being transversely translatable for repositioning driver control. The invention is particularly useful in vehicles which have no engine or engine compartment up front to see over and merely a steering guide that is easily movable to the left or right for a driving position. Driver and passenger have enhanced leg room. The foot rest may accommodate either driver or passenger. The foot rest is preferably used in combination with a vehicle seat. The foot rest has a base translatable longitudinally and/or transversely with respect to the vehicle and with respect to a transversely mountable seat in the vehicle. A post is angularly connected to the base and is preferably translatable up and down to adjust the angle. An elongated beam is pivotally connected to the post and is adjustable to provide the desired angle of foot or leg support. Actuators are connected respectively to the base, post and beam to provide the desired adjustment and may be electrically or hydraulically controlled.

Accordingly, the invention is also a foot rest for use with a seat of a vehicle. The foot rest has a base moveable forwardly and backwardly, a post connected to the base and moveable upwardly and downwardly with respect to the base, and a beam pivotally supported with respect to the base and/or the post. The invention also has a first actuator connected to the base for moving the base, a second actuator connected to the beam for pivoting the beam, and a third actuator for increasing or expanding the surface area of the beam, all to enable adjustments which enhance the comfort of the driver or a passenger.

The invention is also useful in models of mobility interchangeability. This is the process to change the way vehicles are manufactured. Varying styled self-contained vehicle bodies with floors and attached seats can be swapped, interchanged, connected and disconnected with a structural technology frame or rolling platform which includes the power and suspension components. The ability to move and adjust foot pedals for either vehicle control or driver and passenger comfort is particularly advantageous in such models The above objects, features and advantages, and other objects, features and advantages of the present invention are readily apparent from the following detailed description of the best modes for carrying out the invention when taken in connection with the accompanying drawings.

BRIEF DESCRIPTION OF THE DRAWINGS

FIG. 14 is a fragmentary illustration of a foot pedal solidly (or pivotally) mounted to the vehicle body such that pressure (or pivotal movement) of the driver's foot may be read by the by-wire controls;

FIG. 15 is a fragmentary illustration of a foot pedal slidably mounted in a track on the vehicle body, such that the forward, rearward or sideward position relative to the vehicle body is taken into account when the by-wire controls read the actuation of the foot pedal;

FIG. 16 is a fragmentary illustration of a driver's seating system wherein a driver's steering interface and the foot pedals for acceleration and braking are mounted on the seat and the seating system connects by-wire to the vehicle body or chassis;

FIG. 17 is a fragmentary illustration of a foot pedal which may be plugged into and removed from a vehicle body at various selectable interface connector points in the vehicle body or chassis to accommodate the driver's preference of a driving position;

FIG. 18 is an illustration of flush mounted connector pins behind a retractable cover for an interface connection point on the vehicle body or chassis;

DESCRIPTION OF THE PREFERRED EMBODIMENTS

Figure 1:
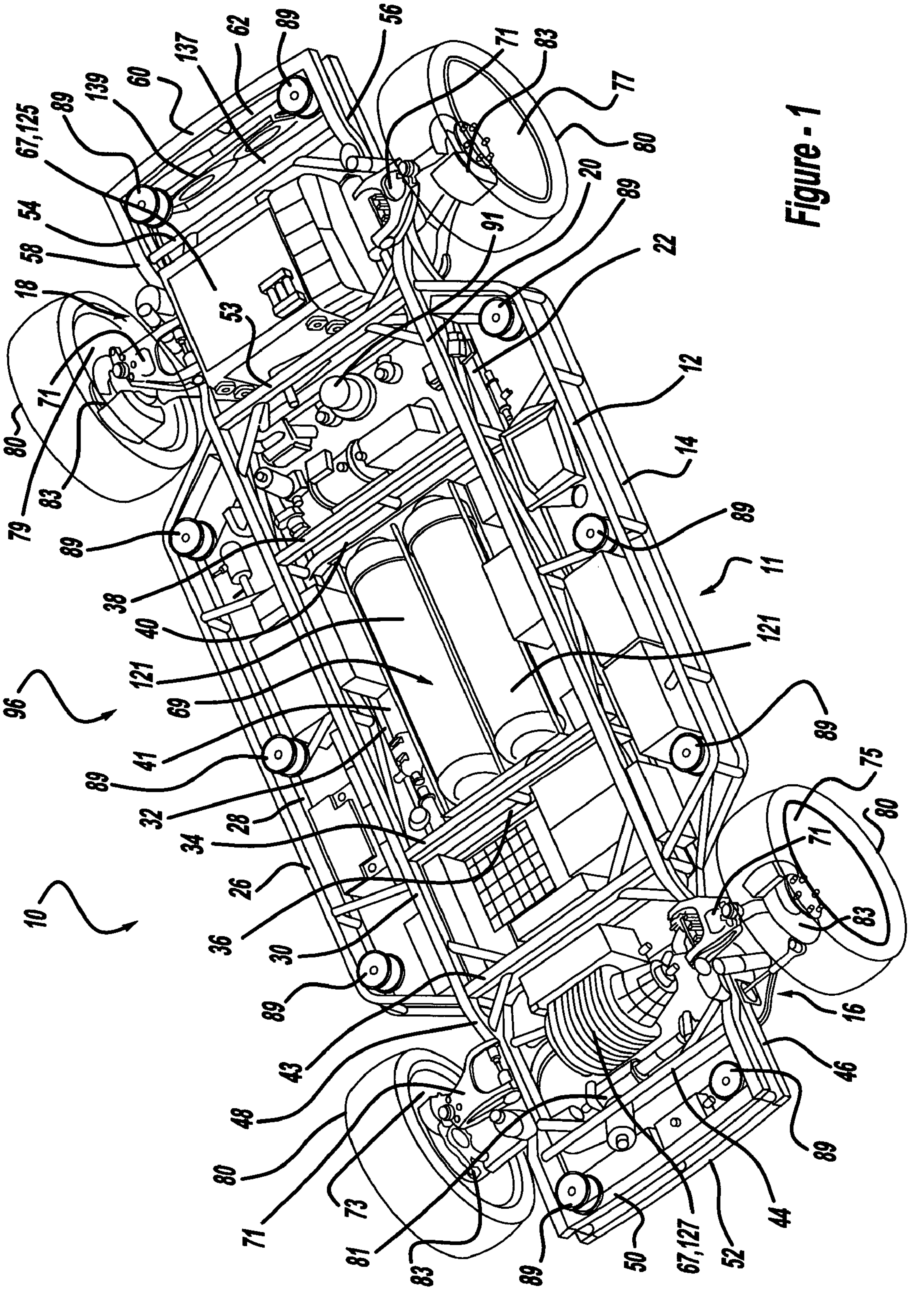
FIG. 1 is a schematic illustration in perspective view of a vehicle rolling platform according to an embodiment of the present invention.

Referring to FIG. 1, a vehicle chassis 10 in accordance with the invention, also referred to as the "rolling platform," includes a structural frame 11. The structural frame 11 depicted in FIG. 1 comprises a series of interconnected structural elements including upper and lower side structural elements 12 and 14 that comprise a "sandwich"-like construction. Elements 12 and 14 are substantially rigid tubular (optionally solid) members that extend longitudinally between the front and rear axle areas 16, 18, and are positioned outboard relative to similar elements 20, 22. The front and rear ends of elements 12, 14 are angled inboard, extending toward elements 20 and 22 and connecting therewith prior to entering the axle areas 16, 18. For added strength and rigidity a number of vertical and angled structural elements extend between elements 12, 14, 20 and 22. Similar to the elements 12, 14, 20 and 22, which extend along the left side of the rolling platform 10, a family of structural elements 26, 28, 30 and 32 extend along the right side thereof.

Lateral structural elements 34, 36 extend between elements 20, 30 and 22, 32, respectively nearer the front axle area 16 and lateral structural elements 38, 40 extend between elements 20, 30 and 22, 32, respectively nearer the rear axle area 18, thereby defining a mid-chassis space 41. The front axle area 16 is defined in and around structural elements 43, 44 at the rear and front, and on the sides by structural elements 46, 48 which may be extensions of the elements 20, 22, 30, 32 or connected therewith. Forward on the front axle area, a forward space is defined between element 44 and elements 50, 52. The rear axle area 18 is defined in and around structural elements 53, 54 at the front and rear, and on the sides by structural elements 56, 58, which may be extensions of the elements 20, 22, 30, 32 or connected therewith. Rearward of the rear axle area 18, a rearward space is defined between element 54 and elements 60, 62. Alternatively, the rear axle area 18 or the rearward space may be elevated relative to the rest of the structural frame 11 if necessary to accommodate an energy conversion system, and the frame may include other elements to surround and protect an energy conversion system. The frame defines a plurality of open spaces between the elements described above. Those skilled in the art will recognize materials and fastening methods suitable for use in the structural frame. For example, the structural elements may be tubular, aluminum, and welded at their respective connections to other structural elements.

Figure 2:
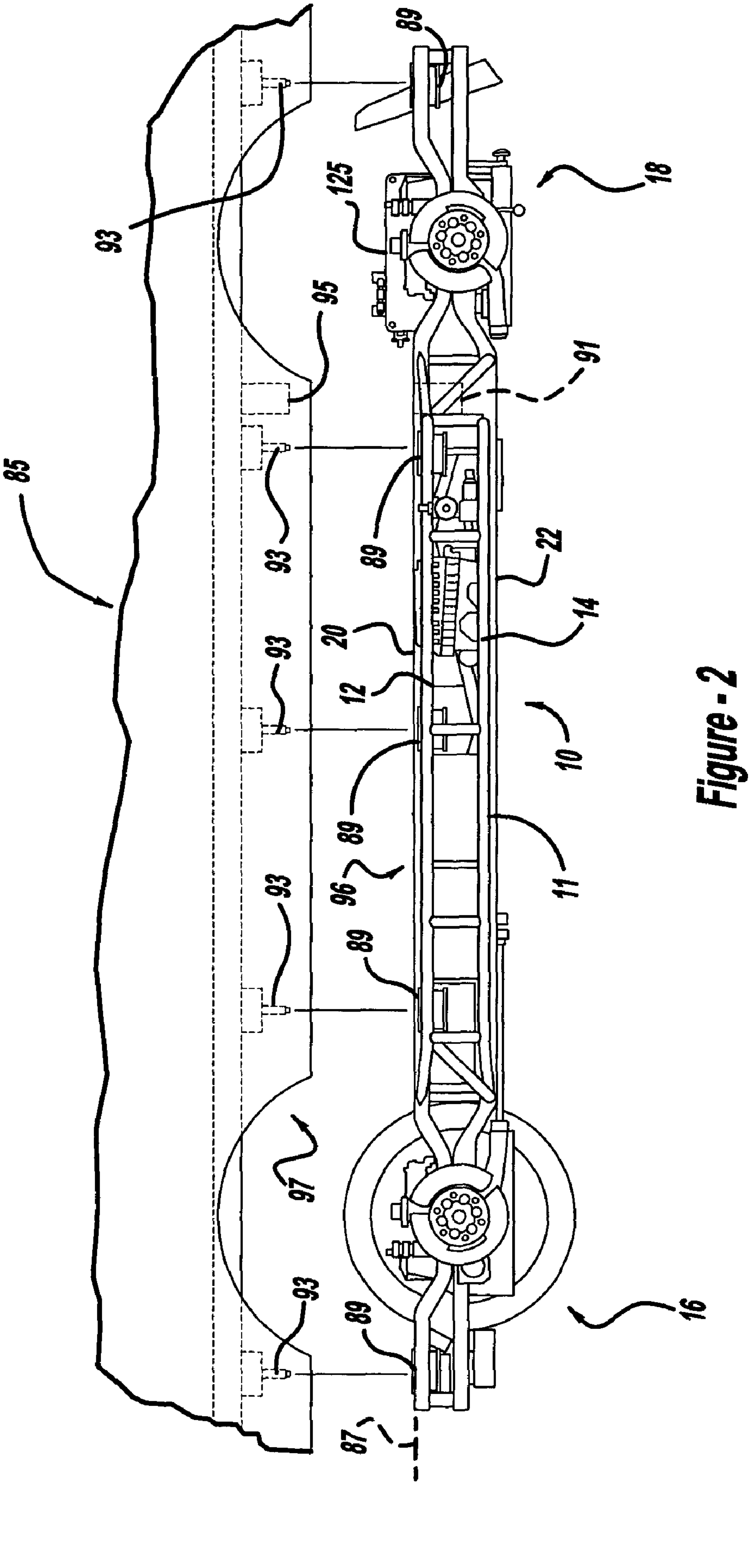
FIG. 2 is a schematic illustration in side view of a vehicle body pod-rolling platform attachment scenario according to the present invention that is useful with the embodiment of FIG. 1.

The structural frame 11 provides a rigid structure to which an energy conversion system 67, energy storage system 69, suspension system 71 with wheels 73, 75, 77, 79 (each wheel having a tire 80), steering system 81, and braking system 83 are mounted, as shown in FIGS. 1-2, and is configured to support an attached body 85, as shown in FIG. 2. A person of ordinary skill in the art will recognize that the structural frame 11 can take many different forms, in addition to the cage-like structure of the embodiment depicted in FIGS. 1–2. For example, the structural frame 11 can be a traditional automotive frame having two or more longitudinal structural members spaced a distance apart from each other, with two or more transverse structural members spaced apart from each other and attached to both longitudinal structural members at their ends. Alternatively, the structural frame may also be in the form of a "belly pan," wherein integrated rails and cross members are formed in sheets of metal or other suitable material, with other formations to accommodate various system components. The structural frame may also be integrated with various chassis components. Also, alternataively, the structural frame may be skinned over as in FIG. 7 with seat attachment couplings 175 and electrical interface connectors 91.

Referring to FIG. 2, a body attachment interface 87 is defined as the sum of all body connection components, i.e., connective elements that function to operably mate a vehicle body to the chassis 10. The body connection components of the preferred embodiment include a plurality of load-bearing body-retention couplings 89 mounted with respect to the structural frame 11 and preferably a single electrical connector box 91 to which the interface connectors 95 connect.

As shown in FIG. 2, the load-bearing body-retention couplings 89 are engageable with complementary attachment couplings 93 on a vehicle body 85 and function to physically fasten the vehicle body 85 to the chassis 10. Those skilled in the art will recognize that a multitude of fastening and locking elements may be used and fall within the scope of the claimed invention. The load-bearing body-retention couplings 89 are preferably releasably engageable with complementary couplings, although non-releasably engageable couplings such as weld flanges or riveting surfaces may be employed within the scope of the claimed invention. Ancillary fastening elements may be used as lock downs in conjunction with the load-bearing body-retention couplings. Load-bearing surfaces without locking or fastening features on the chassis 10 may be used with the load-bearing body-retention couplings 89 to support the weight of an attached vehicle body 85. In the preferred embodiment, the load-bearing body-retention couplings 89 include support brackets with bolt holes. Rubber mounts (not shown) located on the support brackets dampen vibrations transmitted between the body and the chassis. Alternatively, hard mounts may be employed for body-retention couplings.

The electrical connector 95 is engageable with complementary electrical interface connector 91 on a vehicle body 85 or the skinned over surface of the chassis. The electrical connector 91 may perform multiple functions, or select combinations thereof. First, the electrical interface connector 91 may function as an electrical power connector, i.e., it may be configured to transfer electrical energy generated by components on the chassis 10 to a vehicle body 85 or other non-chassis destination. Second, the electrical interface connector 91 may function as a control signal receiver, i.e., a device configured to transfer by-wire or non-mechanical control signals from a non-chassis source to controlled systems including the energy conversion system, steering system and braking. Third, the electrical interface connector 91 may function as a feedback signal conduit through which feedback signals are made available to a vehicle driver. Fourth, the electrical interface connector 91 may function as an external programming interface through which software containing algorithms and data may be transmitted for use by controlled systems. Fifth, the electrical interface connector may function as an information conduit through which sensor information and other information is made available to a vehicle driver. The electrical interface connector 91 may thus function as a communications and power "umbilical" port through which all communications between the chassis 10 and the driver-operable control input device and/or foot pedals in the attached vehicle body 85 are transmitted. Electrical connectors include devices configured to operably connect one or more electrical wires with other electrical wires. The wires may be spaced a distance apart to avoid any one wire causing signal interference in another wire operably connected to an electrical connector or for any reason that wires in close proximity may not be desirable.

If one electrical connector performing multiple functions is not desirable, for example, if a cumbersome wire bundle is required, or power transmission results in control signal interference, the body attachment interface 87 may include a plurality of electrical interface connectors 91 engageable with a plurality of complementary electrical connectors 95 on a vehicle body 85, with different connectors performing different functions. A complementary electrical connector 95 performs functions complementary to the function of the electrical interface connector with which it engages, for example, functioning as a control signal transmitter when engaged with a control signal receiver.

Referring again to FIGS. 1–2, the energy conversion system 67, energy storage system 69, steering system 81 and braking system 83 are configured and positioned on the chassis 10 to minimize the overall vertical height of the chassis 10 and to maintain a substantially horizontal upper chassis face 96. A face of an object is an imaginary surface that follows the contours of the object they face, and are directly exposed to, in a particular direction. Thus, the upper chassis face 96 is an imaginary surface that follows the upwardly facing and exposed contours of the chassis frame 11 and systems mounted therein. Matable vehicle bodies have a corresponding lower body face 97 that is an imaginary surface that follows the downwardly facing and exposed contours of body 85, as shown in FIG. 2.

Referring again to FIGS. 1–2, the structural frame 11 has a thickness defined as the vertical distance between its highest point (the top of structural element 20) and its lowest point (the bottom of structural element 22). In the preferred embodiment, the structural frame thickness is approximately 11 inches. To achieve a substantially horizontal upper chassis face 96, the energy conversion system 67, energy storage system 69, steering system 81, and braking system 83 are distributed throughout the open spaces and are configured, positioned and mounted to the structural frame 11 such that the highest point of any of the energy conversion system 67, energy storage system 69, steering system 81, and braking system 83 does not extend or protrude higher than the highest point of the structural frame 11 by an amount more than 50% of the structural frame thickness. Alternatively, the highest point of any of the energy conversion system 67, energy storage system 69, steering system 81 and braking system 83 does not extend or protrude higher than the top of any of the tires 80. Alternatively, the highest point of any of the energy conversion system 67, energy storage system 69, steering system 81 and braking system 83 does not extend or protrude higher than the top of any of the wheels 73, 75, 77, 79. In the context of the present invention, a tire is not considered part of a wheel. A wheel typically comprises a rim and a wheel disc or nave that connects the rim to a wheel hub, and does not include a mounted tire. A tire is mounted around the periphery of a wheel. The substantially horizontal upper chassis face 96 enables the attached body 85 to have a passenger area that extends the length of the chassis, unlike prior art bodies that have an engine compartment to accommodate a vertically-protruding internal combustion engine.

Most of the powertrain load is evenly distributed between the front and rear of the chassis so there is a lower center of gravity for the whole vehicle without sacrificing ground clearance, thereby enabling improved handling while resisting rollover forces.

Referring again to FIG. 2, the preferred embodiment of the rolling platform 10 is configured such that the lower body face 97 of a matable vehicle body 85 is positioned closely adjacent to the upper chassis face 96 for engagement with the rolling platform 10. The body connection components have a predetermined spatial relationship relative to one another, and are sufficiently positioned, exposed and unobstructed such that when a vehicle body 85 having complementary connection components (complementary attachment couplings 93 and a complementary electrical connector 95) in the same predetermined spatial relationship as the body connection components is sufficiently positioned relative to the upper chassis face 96 of a chassis 10 of the invention, the complementary connection components are adjacent to corresponding body connection components and ready for engagement, as depicted in FIG. 2.

Each body connection component has a spatial relationship relative to each of the other body connection components that can be expressed, for example, as a vector quantity. Body connection components and complementary connection components have the same predetermined spatial relationship if the vector quantities that describe the spatial relationship between a body connection component and the other body connection components to be engaged also describe the spatial relationship between a corresponding complementary connection component and the other complementary connection components to be engaged.

The body connection components and the complementary connection components are preferably adjacent without positional modification when a vehicle body 85 is sufficiently positioned relative to a chassis 10 of the invention.

However, in the context of the present invention, the body connection components may be movable relative to each other within a predetermined spatial relationship to accommodate build tolerances or other assembly issues. For example, an electrical interface connector may be positioned and operably connected to a signal-carrying cable. The cable may be fixed relative to the structural frame at a point six inches from the electrical connector. The electrical connector will thus be movable within six inches of the fixed point on the cable. A body connection component is considered adjacent to a complementary connection component if one or both are movable within a predetermined spatial relationship so as to be in contact with each other.

The body connection components are preferably sufficiently exposed at a chassis face to facilitate attachment to complementary connection components on a matable vehicle body. Similarly, complementary connection components on a matable vehicle body are sufficiently exposed at a body face to facilitate attachment to body connection components on a vehicle chassis.

Figures 6, 6A:
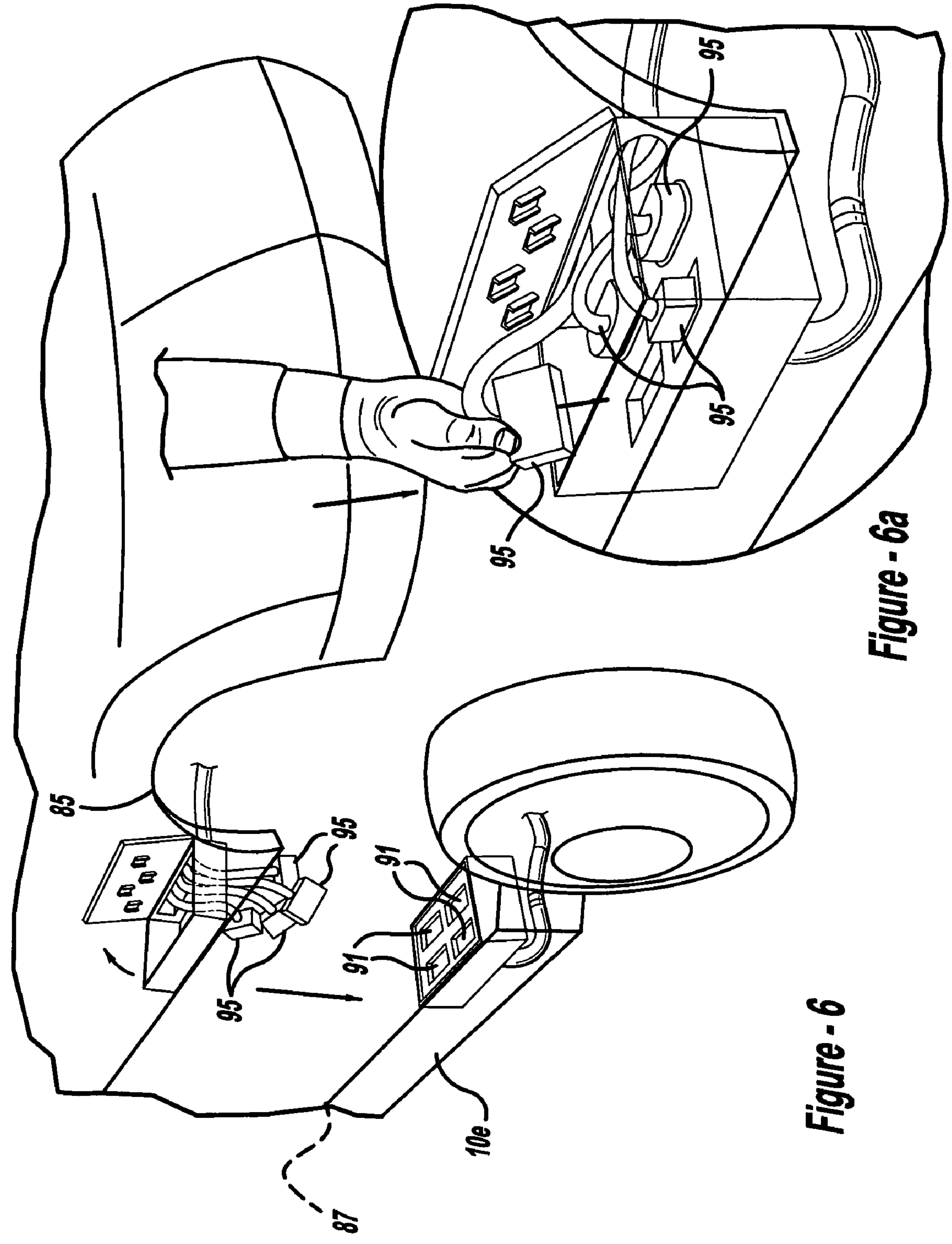
FIGS. 6 and **6*a*** show partial exploded perspective schematic illustrations of a rolling platform according to a further embodiment of the invention in an attachment scenario with a body pod, the rolling platform having multiple electrical connectors engageable with complementary electrical connectors in the body pod.

It is within the scope of the claimed invention to employ a connection device to operably connect a body electrical connector 95 with a distant complementary electrical interface connector 91, in the situation where a vehicle body does not have complementary connection components in the same predetermined spatial relationship as the electrical interface connector on a vehicle chassis. For example, a cable may have two electrical connectors 95 substantially at the electrical interface connector 91 body attachment interface 87 (FIGS. 6, 6*a*). In this arrangement, a complementary interface electrical connector 91 may be provided for each electrical connector 95.

A body may have more complementary connection components than are engageable with the body connection components of a particular chassis. Such an arrangement may be employed to enable a particular body to be matable to multiple chassis each having a different predetermined spatial relationship among its body connection components.

The load-bearing body-retention couplings 89 and the electrical interface connector or connectors 91 are preferably releasably engageable without damage to either an attached body 85 or the chassis 10, thereby enabling removal of one body 85 from the chassis 10 and installation of a different body on the chassis 10.

Referring to FIG. 1, the steering system 81 is housed in the front axle area 16 and is operably connected to the front wheels 73, 75. Preferably, the steering system 81 is responsive to non-mechanical control signals. In the preferred embodiment, the steering system 81 is by-wire. A by-wire system is characterized by control signal transmission in electrical form. In the context of the present invention, "by-wire" systems, or systems that are controllable "by-wire," include systems configured to receive control signals in electronic form via a control signal receiver at or on the body attachment interface 87, and respond in conformity to the electronic control signals.

Examples of steer-by-wire systems are described in U.S. Pat. No. 6,176,341, issued Jan. 23, 2001 to Delphi Technologies, Inc.; U.S. Pat. No. 6,208,923, issued Mar. 27, 2001 to Robert Bosch GmbH; U.S. Pat. No. 6,219,604, issued Apr. 17, 2001 to Robert Bosch GmbH; U.S. Pat. No. 6,318,494, issued Nov. 20, 2001 to Delphi Technologies, Inc.; U.S. Pat. No. 6,370,460, issued Apr. 9, 2002 to Delphi Technologies, Inc.; and U.S. Pat. No. 6,394,218, issued May 28, 2002 to TRW Fahrwerksysteme GmbH & Co., KG; which are hereby incorporated by reference in their entireties.

Electrically conductive wires are used in the preferred embodiment to transfer signals between the chassis 10 and an attached body 85, and between transducers, control units and actuators. Those skilled in the art will recognize that other non-mechanical means of sending and receiving signals between a body and a chassis, and between transducers, control units, and actuators may be employed and fall within the scope of the claimed invention. Other non-mechanical means of sending and receiving signals include electromagnetic radiation and fiber optics.

Figure 3:
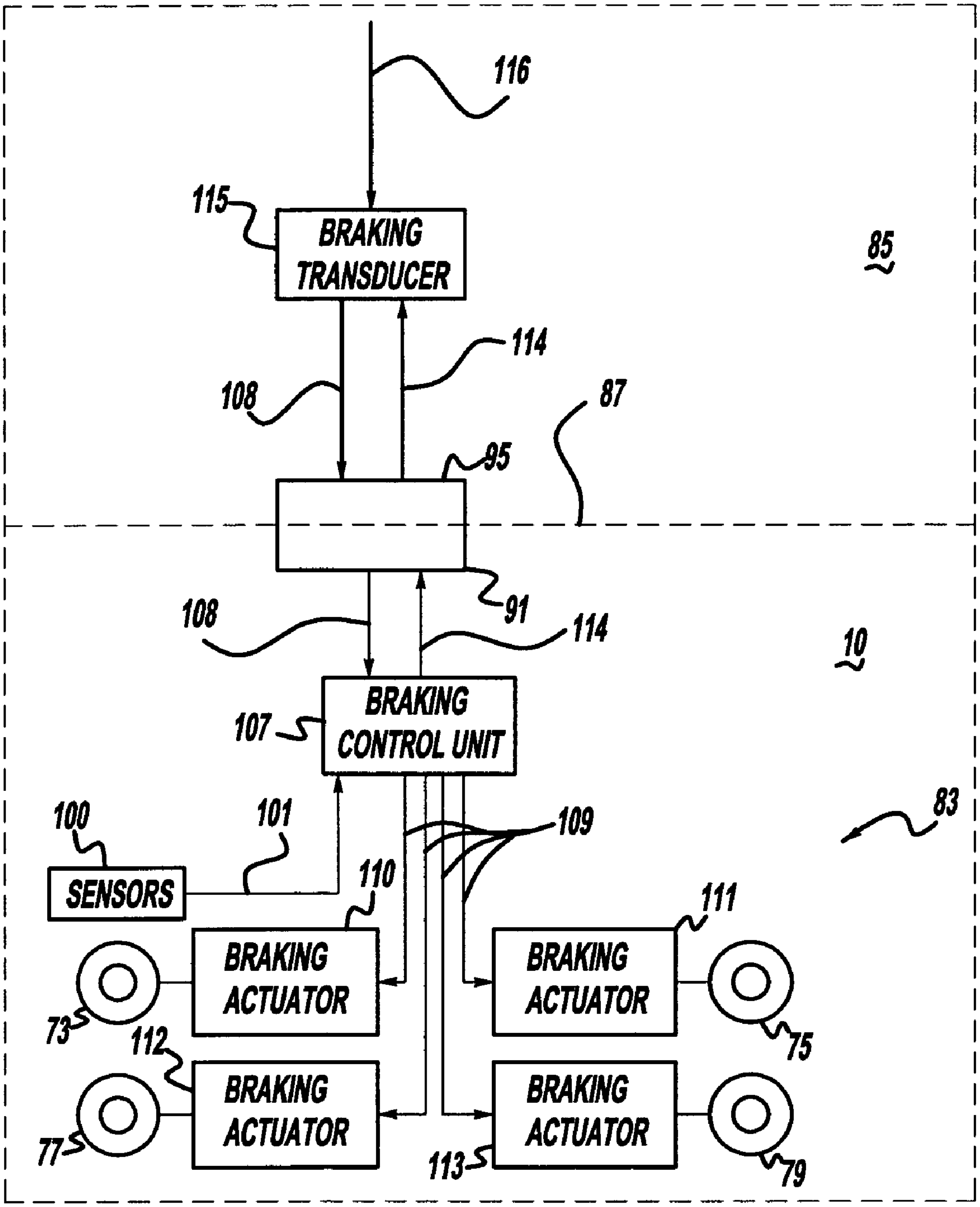
FIG. 3 is a schematic illustration of a braking system for use with the rolling platform and body pod of FIG. 2.

Referring again to FIG. 1, a braking system 83 is mounted to the structural frame 11 and is operably connected to the wheels 73, 75, 77, 79. The braking system is configured to be responsive to non-mechanical control signals. In the preferred embodiment, the braking system 83 is by-wire, as depicted schematically in FIG. 3. Sensors 100 transmit sensor signals 101 carrying information concerning the state or condition of the chassis 10 and its component systems to a braking control unit 107. The braking control unit 107 is connected to the electrical connector 91 and is configured to receive electrical braking control signals 108 via the electrical connector 91. The braking control unit 107 processes the sensor signals 101 and the electrical braking control signals 108 and generates braking actuator control signals 109 according to a stored algorithm. The braking control unit 107 then transmits the braking actuator control signals 109 to braking actuators 110, 111, 112, 113 which act to reduce the angular velocity of the wheels 73, 75, 77, 79. Those skilled in the art will recognize the manner in which the braking actuators 110, 111, 112, 113 act on the wheels 73, 75, 77, 79. Typically, actuators cause contact between friction elements, such as pads and disc rotors. Optionally, an electric motor may function as a braking actuator in a regenerative braking system.

The braking control unit 107 may also generate braking feedback signals 114 for use by a vehicle driver and transmit the braking feedback signals 114 through the electrical connector 91. The braking actuators 110, 111, 112, 113 apply force through a caliper to a rotor at each wheel. Some of the sensors 100 measure the applied force on each caliper. The braking control unit 107 uses this information to ensure synchronous force application to each rotor.

Referring again to FIG. 3, the chassis 10 is configured such that the braking system is responsive to any source of compatible electrical braking control signals 108. A braking transducer 115 may be located on an attached vehicle body 85 and connected to a complementary electrical connector 95 coupled with the electrical interface connector 91. The braking transducer 115 converts vehicle driver-initiated mechanical braking control signals 116 into electrical form and transmits the electrical braking control signals 106 to the braking control unit via the electrical interface connector 91. In the preferred embodiment, the braking transducer 115 includes a hand operated or a foot pedal operated device described hereinafter. The braking transducer 115 includes sensors that measure both the rate of applied pressure and the amount of applied pressure to the foot pedal assemblies, thereby converting mechanical braking control signals 116 to electrical braking control signals 108. The braking control unit 107 processes both the rate and amount of applied pressure to provide both normal and panic stopping. Handgrip assemblies may also be used.

Examples of brake-by-wire systems are described in U.S. Pat. No. 5,366,281, issued Nov. 22, 1994 to General Motors Corporation; U.S. Pat. No. 5,823,636, issued Oct. 20, 1998 to General Motors Corporation; U.S. Pat. No. 6,305,758, issued Oct. 23, 2001 to Delphi Technologies, Inc.; and U.S.

Pat. No. 6,390,565, issued May 21, 2002 to Delphi Technologies, Inc.; which are hereby incorporated by reference in their entireties.

The system described in U.S. Pat. No. 5,366,281 includes an input device for receiving mechanical braking control signals, a brake actuator and a control unit coupled to the input device and the brake actuator. The control unit receives brake commands, or electrical braking control signals, from the input device and provides actuator commands, or braking actuator control signals, to control current and voltage to the brake actuator. When a brake command is first received from the input device, the control unit outputs, for a first predetermined time period, a brake torque command to the brake actuator commanding maximum current to the actuator. After the first predetermined time period, the control unit outputs, for a second predetermined time period, a brake torque command to the brake actuator commanding voltage to the actuator responsive to the brake command and a first gain factor. After the second predetermined time period, the control unit outputs the brake torque command to the brake actuator commanding current to the actuator responsive to the brake command and a second gain factor, wherein the first gain factor is greater than the second gain factor and wherein a brake initialization is responsive to the brake input.

U.S. Pat. No. 6,390,565 describes a brake-by-wire system that provides the capability of both travel and force sensors in a braking transducer connected to a brake apply input member such as a brake pedal and also provides redundancy in sensors by providing the signal from a sensor responsive to travel or position of the brake apply input member to a first control unit and the signal from a sensor responsive to force applied to a brake apply input member to a second control unit. The first and second control units are connected by a bi-directional communication link whereby each controller may communicate its received one of the sensor signals to the other control unit. In at least one of the control units, linearized versions of the signals are combined for the generation of first and second brake apply company signals for communication to braking actuators. If either control unit does not receive one of the sensor signals from the other, it nevertheless generates its braking actuator control signal on the basis of the sensor signal provided directly to it. In a preferred embodiment of the system, a control unit combines the linearized signals by choosing the largest magnitude.

Referring again to FIG. 1, the energy storage system 69 stores energy that is used to propel the chassis 10. for most applications, the stored energy will be in chemical form. Examples of energy storage systems 69 include fuel tanks and electric batteries. In the embodiment shown in FIG. 1, the energy storage system 69 includes two compressed gas cylinder storage tanks 121 (5,000 psi, or 350 bars) mounted within the mid-chassis space 41 and configured to store compressed hydrogen gas. Employing more than two compressed gas cylinder storage tanks may be desirable to provide greater hydrogen storage capacity. Instead of compressed gas cylinder storage tanks 121, an alternate form of hydrogen storage may be employed such as metal or chemical hydrides. Hydrogen generation or reforming may also be used.

The energy conversion system 67 converts the energy stored by the energy storage system 69 to mechanical energy that propels the chassis 10. In the preferred embodiment, depicted in FIG. 1, the energy conversion system 67 includes a fuel cell stack 125 located in the rear axle area 18, and an electric traction motor 127 located in the front axle area 16. The fuel cell stack 125 produces a continuously available power of 94 kilowatts. Fuel cell systems for vehicular use are described in U.S. Pat. No. 6,195,999, issued Mar. 6, 2001 to General Motors Corporation; U.S. Pat. No. 6,223,843, issued May 1, 2001 to General Motors Corporation; U.S. Pat. No. 6,321,145, issued Nov. 20, 2001 to Delphi Technologies, Inc; and U.S. Pat. No. 6,394,207, issued May 28, 2002 to General Motors Corporation; which are hereby incorporated by reference in the entireties.

The fuel cell stack 125 is operably connected to the compressed gas cylinder storage tanks 121 and to the traction motor 127. The fuel cell stack 125 converts chemical energy in the form of hydrogen from the compressed gas cylinder storage tanks 121 into electrical energy, and the traction motor 127 converts the electrical energy to mechanical energy, and applies the mechanical energy to rotate the front wheels 73, 75. Optionally, the fuel cell stack 125 and traction motor 127 are switched between the front axle area 16 and rear axle area 18. Optionally, the energy conversion system includes an electric battery (not shown) in hybrid combination with the fuel cell to improve chassis acceleration. Other areas provided between the structural elements are useful for housing other mechanisms and systems for providing the functions typical of an automobile as shown in FIGS. 1 and 2. Those skilled in the art will recognize other energy conversion systems 67 that may be employed within the scope of the present invention.

Figure 4:
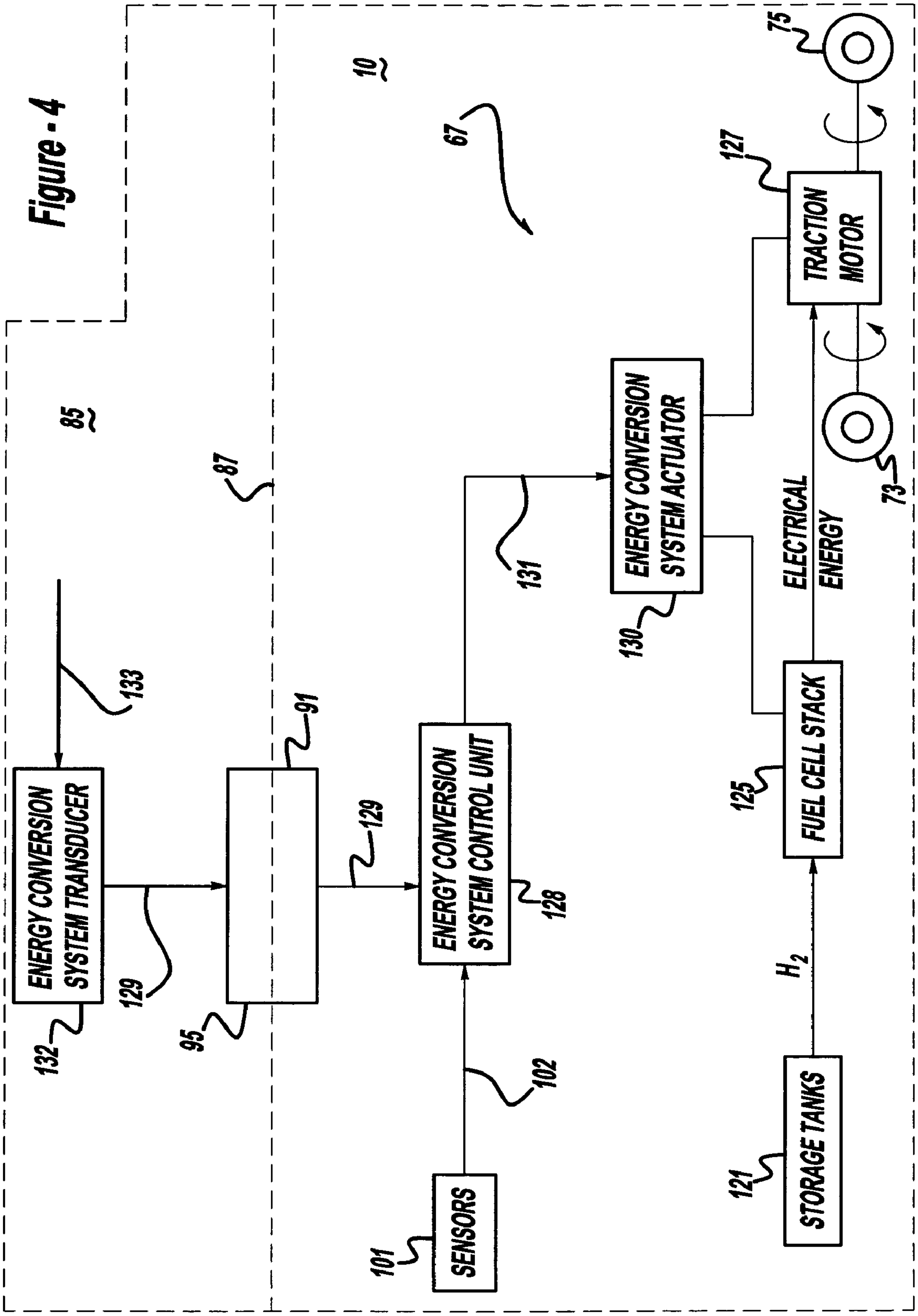
FIG. 4 is a schematic illustration of an energy conversion system for use with the rolling platform and body pod of FIG. 2.

The energy conversion system 67 is configured to respond to non-mechanical control signals. The energy conversion system 67 of the preferred embodiment is controllable by-wire, as depicted in FIG. 4. An energy conversion system control unit 128 is connected to the electrical connector 91 from which it receives electrical energy conversion system control signals 129, and sensors 100 from which it receives sensor signals 101 carrying information about various chassis conditions. The information conveyed by the sensor signals 101 to the energy conversion system control unit 128 includes chassis velocity, electrical current applied, rate of acceleration of the chassis and motor shaft speed to ensure smooth launches and controlled acceleration. The energy conversion system control unit 128 is connected to an energy conversion system actuator 130 and transmits energy conversion system actuator control signals 131 to the energy conversion system actuator 130 in response to the electrical energy conversion system control signals 129 and sensor signals 101 according to a stored algorithm. The energy conversion system actuator 130 acts on the fuel cell stack 125 or traction motor 127 to adjust energy output. Those skilled in the art will recognize the various methods by which the energy conversion system actuator 130 may adjust the energy output of the energy conversion system. For example, a solenoid may alternately open and close a valve that regulates hydrogen flow to the fuel cell stack. Similarly, a compressor that supplies oxygen (from air) to the fuel cell stack may function as an actuator, varying the amount of oxygen supplied to the fuel cell stack in response to signals from the energy conversion system control unit.

An energy conversion system transducer 132 may be located on a vehicle body 85 and connected to a complementary electrical connector 95 engaged with the electrical interface connector 91. The energy conversion system transducer 132 is configured to convert mechanical energy conversion system control signals 133 to electrical energy conversion system control signals 129.

Figure 7:
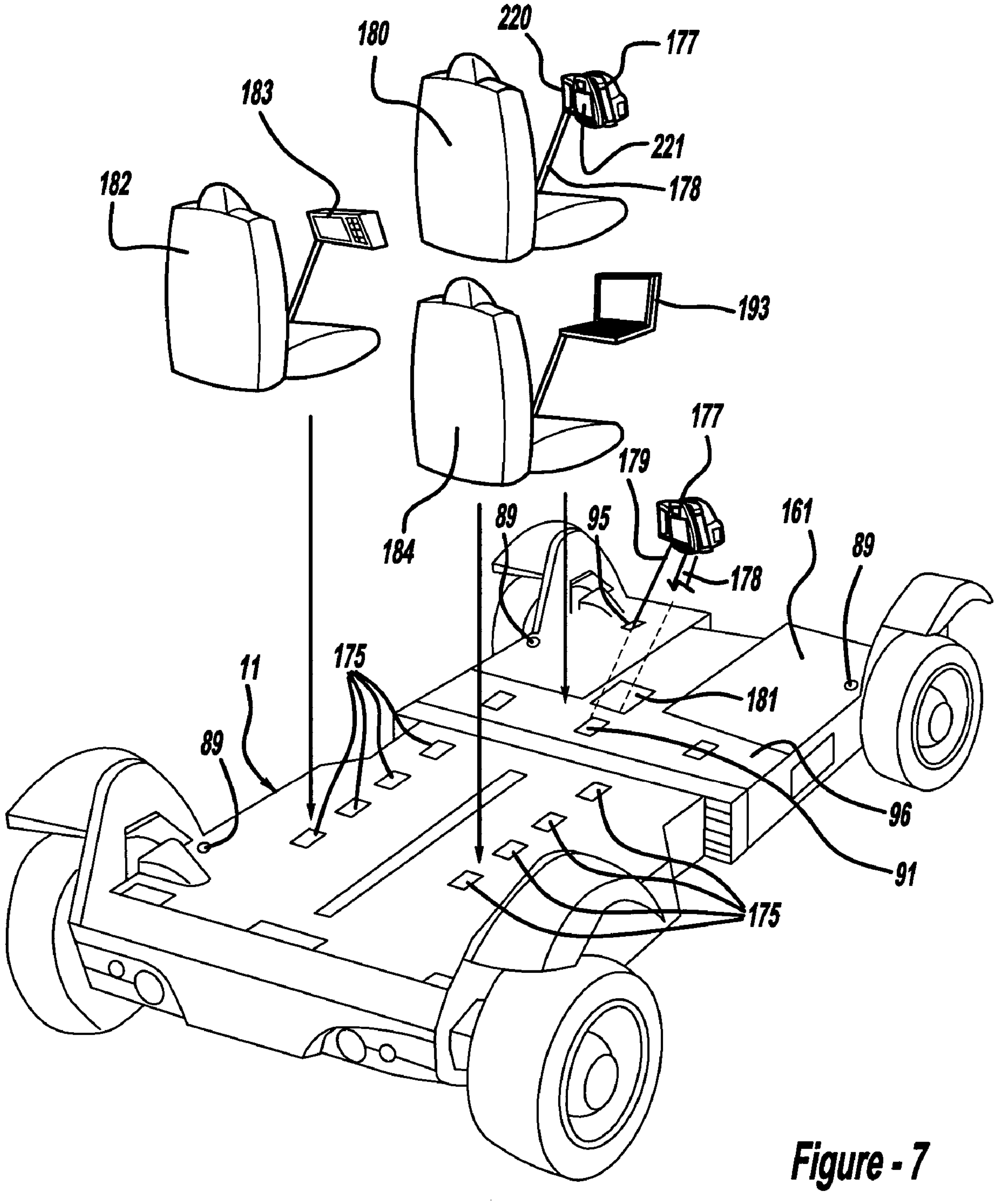
FIG. 7 is an exploded perspective schematic illustration of a skinned rolling platform according to yet another embodiment of the invention, the rolling platform having a movable control input device and interchangeable seats selectively equipped with the control input device and various electronic entertainment and workstation units.

Electrically conductive wire or wires 179 are used in the preferred embodiment to transfer signals between the chassis 10 and an attached body 85, and between transducers, control units and actuators. With reference to FIG. 7, the wire 179 extends from a hand or driver-operable control input device 177 to an electrical interface connector 91 to complete the by-wire communication between the control input device 177 and the chassis 10. The structural support 178 for the control input device 177 is adapted to connect or plug into an input device retention coupling 181 or into a driver's seat 180. Those skilled in the art will recognize that other non-mechanical means of sending and receiving signals between a body and a chassis, and between transducers, control units and actuators may be employed and fall within the scope of the claimed invention. Other non-mechanical means of sending and receiving signals include radio waves and fiber optics.

The by-wire systems are networked in the preferred embodiment, in part to reduce the quantity of dedicated wires connected to the electrical connector 91. A serial communication network is described in U.S. Pat. No. 5,534, 848, issued Jul. 9, 1996 to General Motors Corporation, which is hereby incorporated by reference in its entirety. An example of a networked drive-by-wire system is described in U.S. Patent Application Publication No. US 2002/ 0029408, Ser. No. 09/775,143, which is hereby incorporated by reference in its entirety. Those skilled in the art will recognize various networking devices and protocols that may be used within the scope of the claimed invention, such as SAE J1850 and CAN ("Controller Area Network"). A TPP ("Time Triggered Protocol") network is employed in the preferred embodiment of the invention for communication management.

Figure 5:
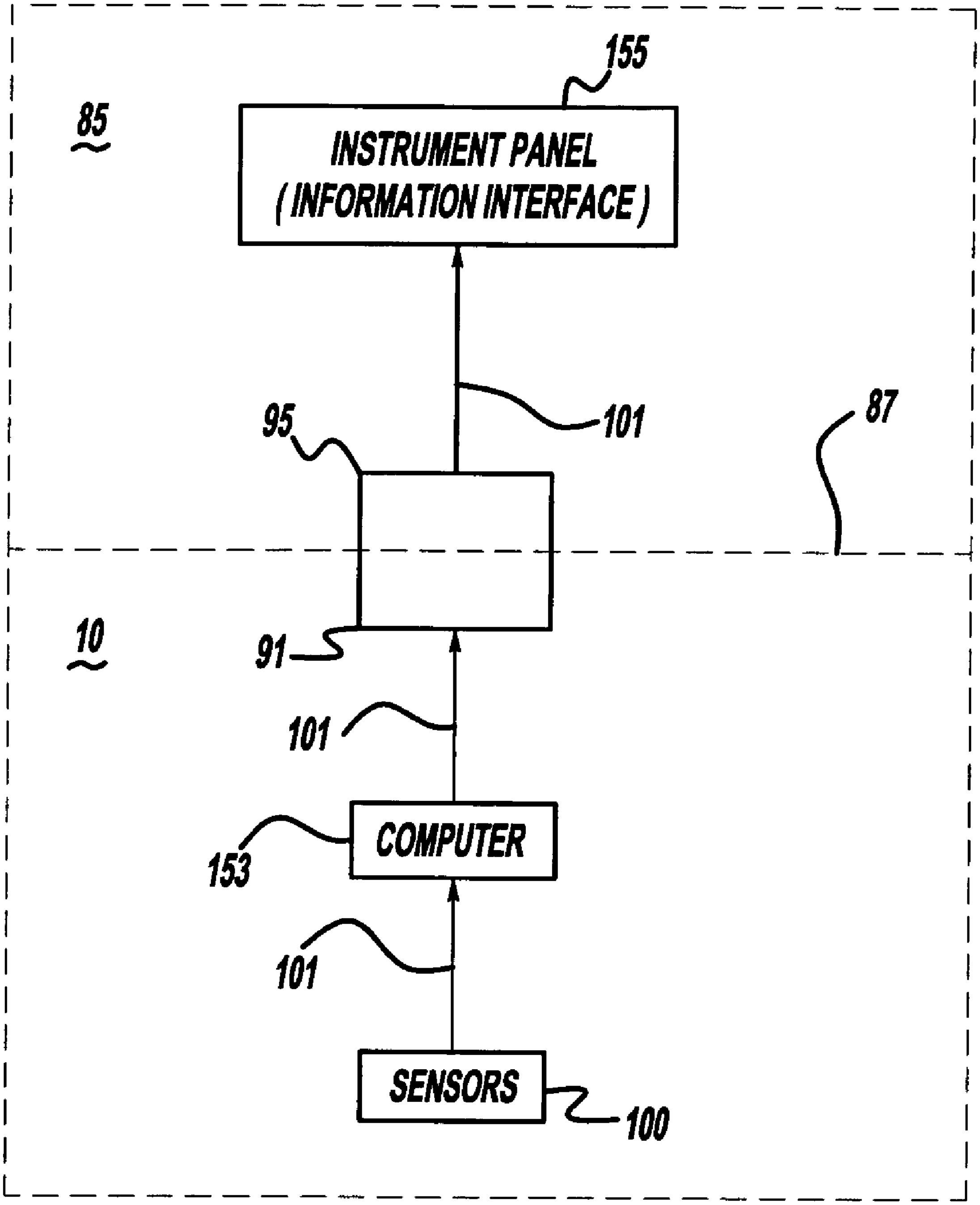
FIG. 5 is a schematic illustration of a chassis computer and chassis sensors for use with the rolling platform and body pod of FIG. 2.

Some of the information collected by the sensors 100, such as chassis velocity, fuel level and system temperature and pressure, is useful to a vehicle driver for operating the chassis and detecting system malfunctions. As shown in FIG. 5, the sensors 100 are connected to the electrical interface connector 91 through a chassis computer 153. Sensor signals 101 carrying information are transmitted from the sensors 100 to the chassis computer 153, which processes the sensor signals 101 according to a stored algorithm. The chassis computer 153 transmits the sensor signals 101 to the electrical interface connector 91 when, according to the stored algorithm, the sensor information is useful to the vehicle driver. For example, a sensor signal 101 carrying temperature information is transmitted to the electrical connector 91 by the chassis computer 153 when the operating temperature of the chassis 10 is unacceptably high. A driver-readable information interface 155 may be attached to a complementary electrical connector 95 coupled with the electrical connector 91 and display the information contained in the sensor signals 101. Driver-readable information interfaces include, but are not limited to, gauges, meters, LED displays and LCD displays. The chassis may also contain communications systems, such as antennas and telematics systems that are operably connected to an electrical connector in the body-attachment interface 87 and configured to transmit information to an attached vehicle body.

FIGS. 6 and 6*a* depict a chassis 10 within the scope of the invention and a body 85 each having multiple electrical interface connectors 91 and multiple complementary electrical connectors 95, respectively. For example, a first electrical interface connector 91 may be operably connected to the steering system and function as a control signal receiver. A second electrical interface connector 91 may be operably connected to the braking system and function as a control signal receiver. A third electrical interface connector 91 may be operably connected to the energy conversion system and function as a control signal receiver. A fourth electrical interface connector 91 may be operably connected to the energy conversion system and function as an electrical power connector. Four multiple wire in-line connectors and complementary connectors are used in the embodiment shown in FIGS. 6 and 6*a*. FIG. 6*a* depicts an assembly process for attaching corresponding connectors 91, 95.

Figure 9:
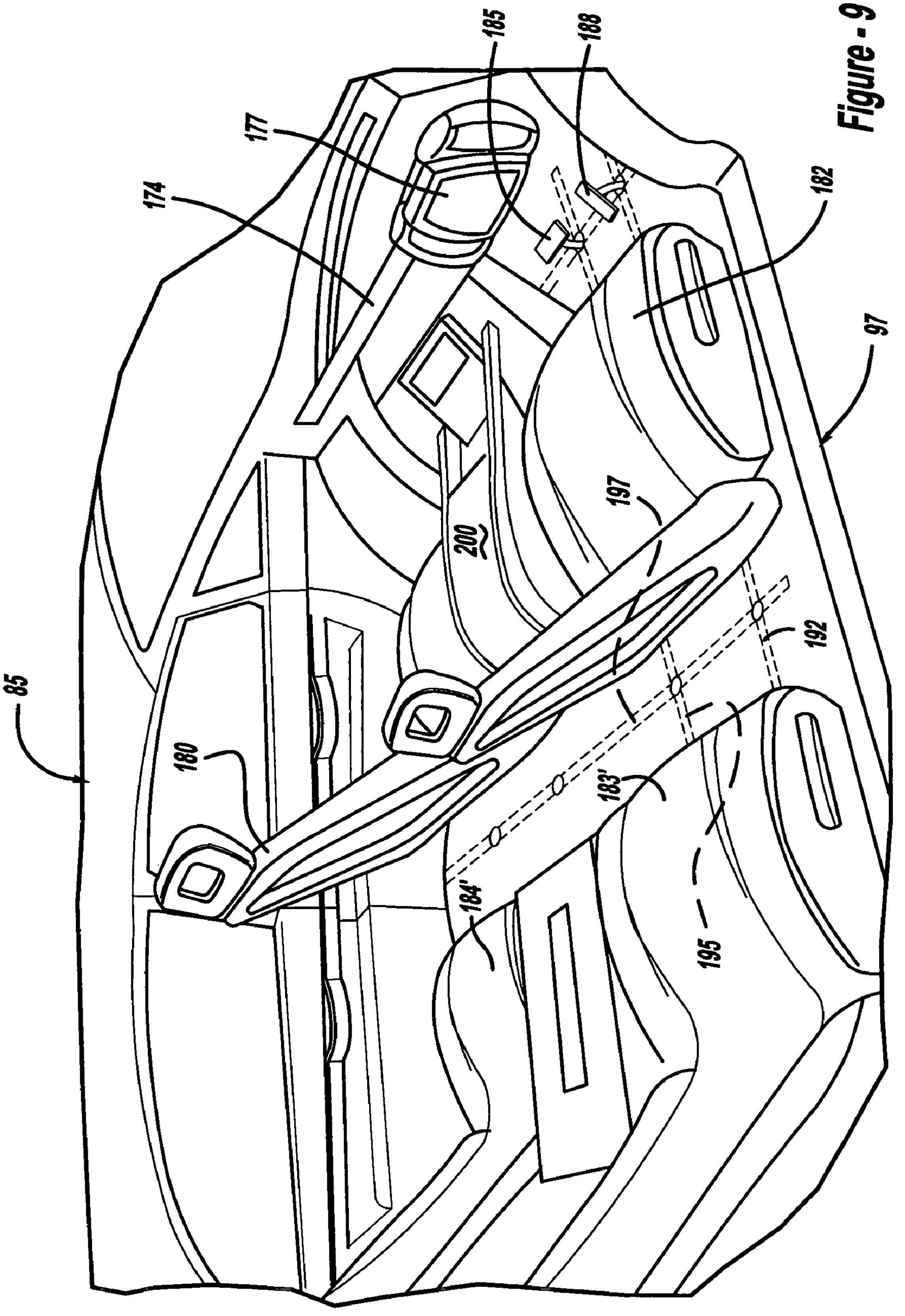
FIG. 9 is a fragmentary illustration of a vehicle interior to show track arrangements to facilitate alternate driving positions for accelerating and braking and for steering.
Figure 10:
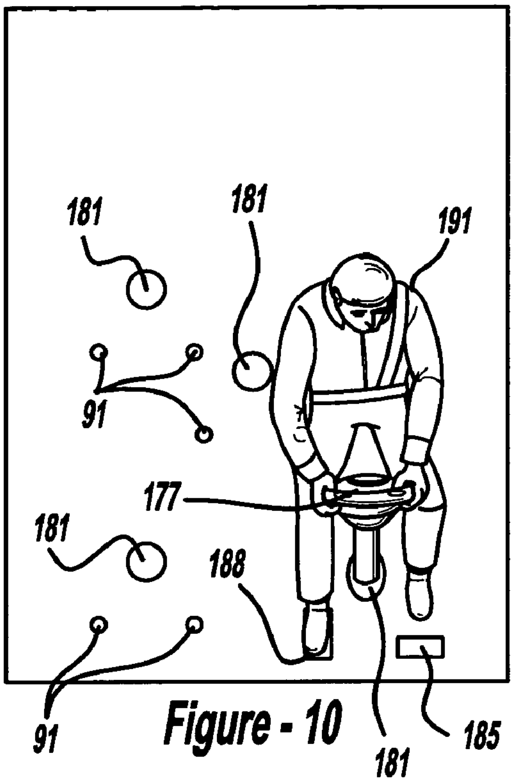
FIG. 10 is a schematic illustration of a driver in a left side driving position with alternative interface connector points for by-wire steering, acceleration and braking.
Figure 11:
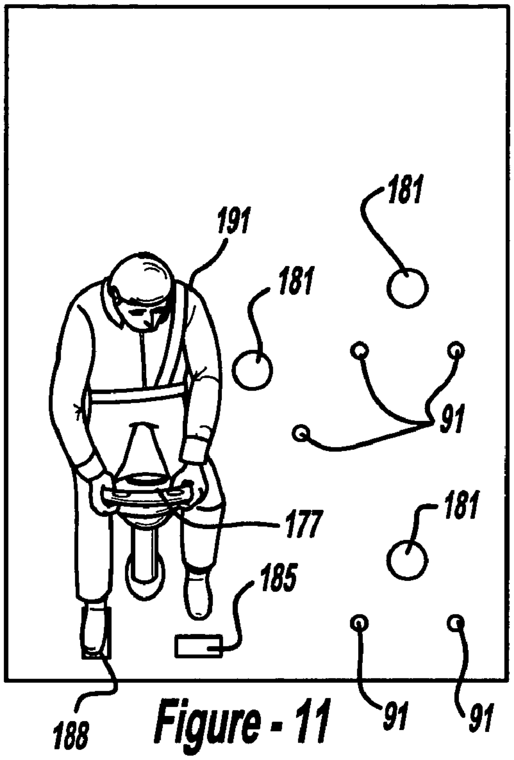
FIG. 11 is a schematic illustration as in FIG. 10 of a driver in a right side driving position.
Figure 12:
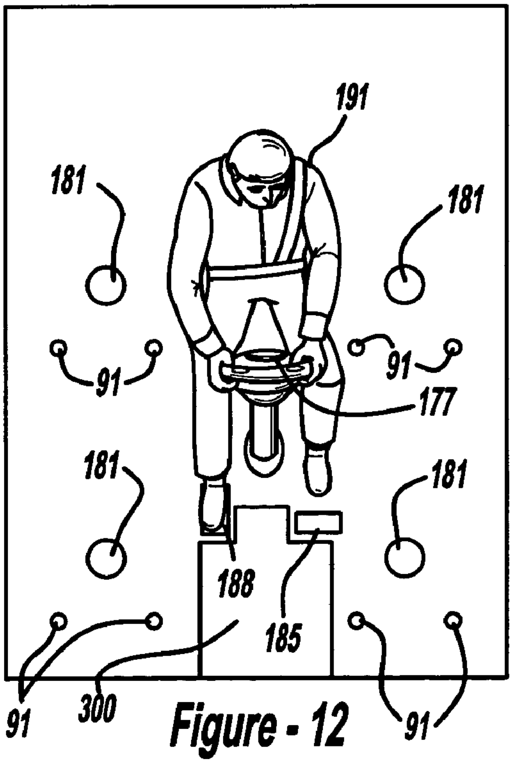
FIG. 12 is a schematic illustration as in FIG. 10 of a driver in a rear center driving position with foot pedals positionable on a vehicle console.
Figure 13:
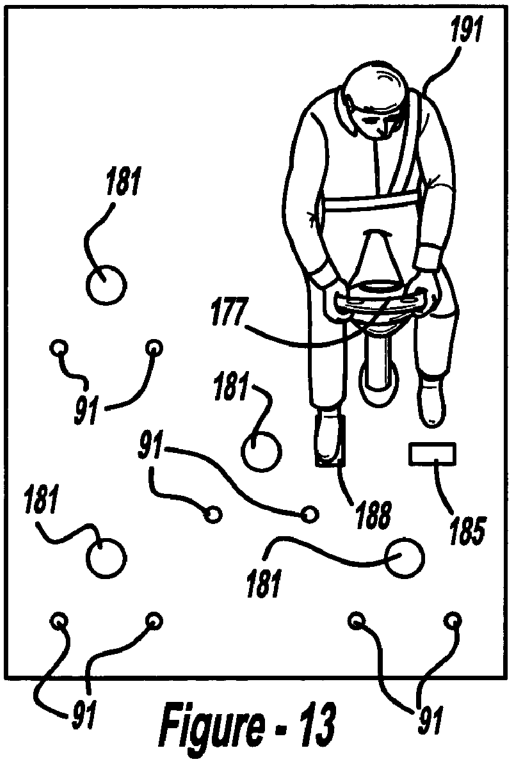
FIG. 13 is a schematic illustration as in FIG. 10 of a driver in a left rear driving position alongside alternative interface connector points for a right rear driving position.

Referring to FIG. 7, a further embodiment of the claimed invention is depicted. The chassis 10 has a rigid covering 161 as its upper chassis face 96 and a plurality of passenger seating attachment couplings 175. A driver-operable control input device 177 containing a steering transducer, a braking transducer and an energy conversion system transducer, is operably connected to the steering system, braking system and energy conversion system by wires 179 and movable to different attachment points. The self-contained control input device 177 can also be movable on a track 174 which permits the input device to slide from side to side to give the drive a selectable front left or right driving position (FIG. 9).

In FIG. 7, seat 180 is a driver's seat which is a self-contained unit or seating system including the manually operable driver's control input device to control steering, acceleration and braking. Seat 180 is movable between front left and right driving positions and rear left and right driving positions in accordance with the selected attachment coupling 175.

Seat 182 is a passenger seat with an entertainment center 183.

Seat 184 is a passenger seat with a computer work station 193.

The embodiment depicted in FIG. 7 also enables vehicle bodies of varying designs and configurations to mate with a common design chassis 10. A vehicle body without a lower surface but having complementary attachment couplings is matable to the chassis 10 at the load-bearing body retention couplings 89. Passenger seating assemblies 182, 184 may be attached to the chassis at selected passenger seating attachment couplings 175.

Referring again to FIGS. 6 and 6*a*, those skilled in the art will recognize that the in-line electrical interface connectors 91 depicted are configured for releasable engagement with complementary electrical connectors 95. It will be apparent to those skilled in the art that a multitude of electrical connectors configured for releasable engagement may be employed within the scope of the claimed invention.

In the embodiment described above, the braking transducer 115 includes two hand-grip assemblies. Also as shown in FIG. 7, a driver-operable control input device 177 containing the hand-grip type steering transducer, a braking transducer and an energy conversion system transducer is operably connected to the steering system, braking system and energy conversion system by wires such as 179 at each of the driving positions selected. It will be appreciated that the low profile rolling chassis 10 enabled by fuel cells and the by-wire technology permits this broad range of seating positions and driving positions within the vehicle.

Furthermore, it will be appreciated that many persons are most acquainted with the foot pedal arrangements of the prior art for braking and accelerating and may not prefer the hand-type grip assembly shown in the preferred embodiment of FIG. 7. Accordingly, another embodiment that is complementary to the above vehicle arrangement will now be described with reference to FIGS. 8–24. The braking transducer 115 may preferably be comprised of a braking foot pedal 185 which is adjustably and/or removably mounted to the vehicle body 85 (FIG. 15). The foot pedal 185 preferably has a base portion 186 that is adjustably and/or removably connected to a guide track arrangement 192 on the vehicle body 85 or chassis 10. A pedal portion 187 is connected to the base portion 186. It will be appreciated that the base portion 186 and the foot pedal portion 187 could be formed integral or separate components connected together in various manners, as described further hereinafter.

In addition, the energy conversion system transducer 132 may preferably be comprised of an acceleration foot pedal 188 that is adjustably and/or removably connected to the track arrangement 192 on the chassis 10 or the vehicle body 85. The foot pedal 188 preferably has a base portion 189 and a pedal portion 190 that is connected to the base portion 189. It will be appreciated that the base portion 189 and the pedal portion 190 could be formed integral or as separate components connected together in various manners, as described further hereinafter.

The vehicle occupant or driver 191 presses his foot on the brake pedal portion 187 to activate the braking transducer 115 including the sensors that measure both the rate of applied pressure and the amount of applied pressure, thereby converting mechanical braking control signals 116 to electrical braking control signals 108. The braking control unit 107 processes both the rate and amount of applied pressure to provide both normal and panic stopping, as earlier described herein in detail.

The vehicle occupant 191 alternately presses his foot on the accelerator pedal portion 188 to activate the energy conversion system transducer 132 that is configured to convert mechanical energy conversion system control signals 133 to electrical energy conversion system control signals 129, as was described in detail above.

Referring to FIGS. 14, 15 and 17, the pedal portions 187/190 may be either solidly mounted to the base portions 187/190 such that pressure of the occupant's foot is read and/or the forward to rearward position relative to the vehicle body 85 is read as an input measure, or the pedal portions 186/189 may be pivotally connected to the base portion 186/189 such that the angular position of the pedal portion 187/190 is read as input. Suitable electrical sensors may be used to read the pressure or positional input.

The base portions 186/189 of the foot pedals 185/188 preferably contain or are connected to the electrical connectors 95 which are coupled with the electrical interface connectors 91 that transmit the electrical signal from the brake transducer 115 or energy conversion transducer 132 operated by the foot pedals 185/188 to the brake actuators or energy conversion system actuators, as described in detail hereinbefore.

Figure 8:
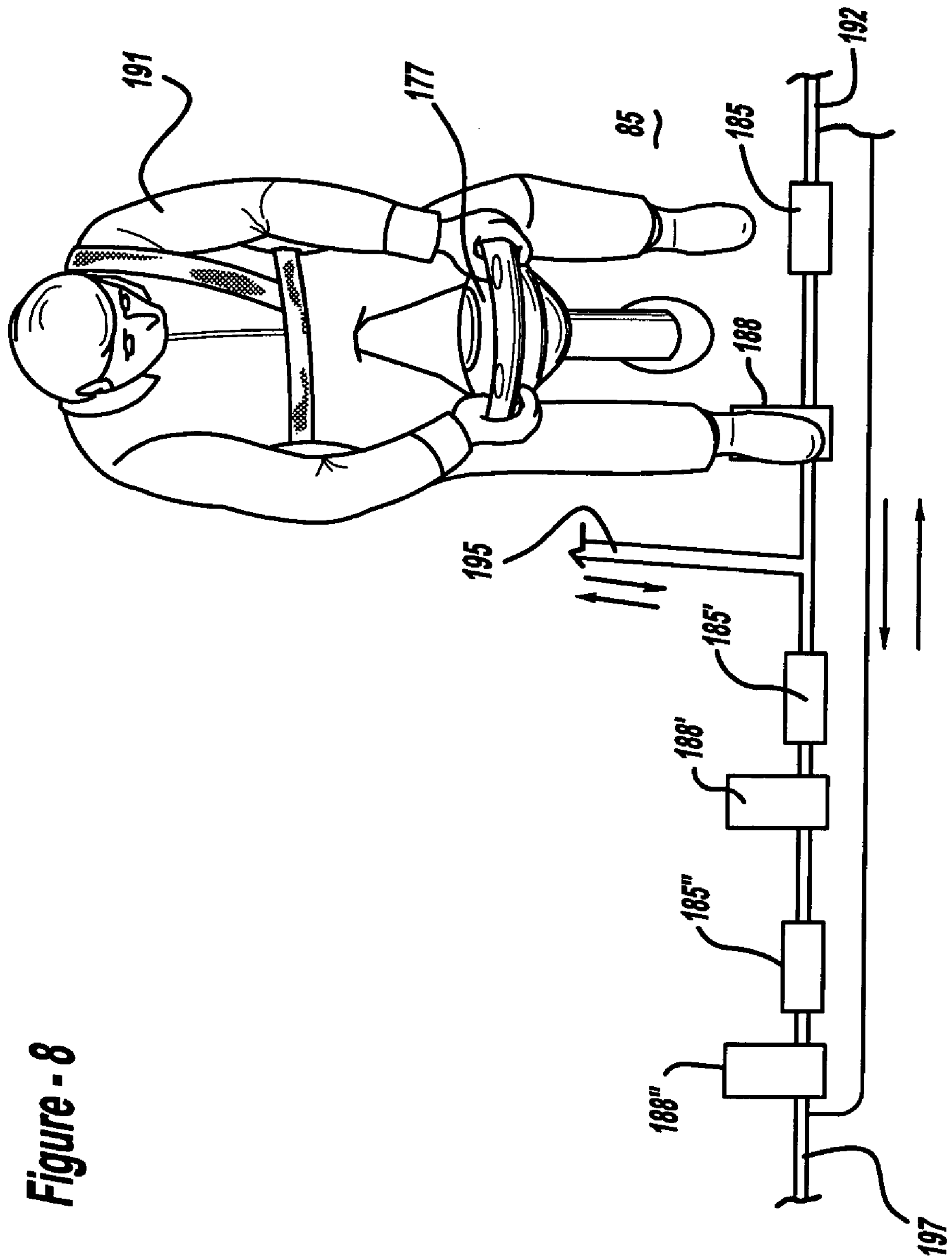
FIG. 8 is a schematic illustration of a removably and shiftably mountable driver's seat position and steering control input device for use in combination with laterally movable foot pedals for acceleration and braking.

As shown in FIGS. 8 and 9, it will be appreciated that the foot pedals 185/188 can be adjustably moved around the floor for the vehicle body 85 by use of a track arrangement 192 or system of tracks that extend either longitudinally on a longitudinal track portion 193 or laterally on a transverse track portion 197 or diagonally or in any direction around the vehicle, see FIG. 9. Preferably the tracks have a power source connected to them so that the track 192 can transmit power to move the pedals 185/188 to any location along the track 192. Thus, the foot pedals 185/188 can be moved to any desired location along the track 192 such that the vehicle can be operated from many locations or positions. The track 192 can be positioned in cooperation with the seat attachment couplings 175, see FIG. 7.

Under some circumstances, the track arrangement may be cumbersome. Referring to FIGS. 10–13, a vehicle may contain numerous foot pedal electrical interface connectors 91 as well as steering interface points. These interface connectors could be independent from each other and located on the vehicle floor as shown or vehicle interior. The steering transducer input as well as the braking transducer input and the energy conversion system input can be moved around the vehicle, and are easily reconfigurable. Thus, the foot pedals 185/188 can be reconfigured for left hand and right hand drive, forward and rearward driving, and also to a central position driving. Different driving positions may be desirable depending on the number of vehicle occupants and the country in which the vehicle is being driven. The foot pedals 185/188 may be provided with electrical connectors 95 which may be plugged into the respective electrical interface connectors 91 to make an electrical/data connection—similar to an outlet or plug. In fact, this plurality of electrical/data interfaces could be scattered throughout the vehicle and be used not only for the foot pedals 185/188 but for other vehicle component or accessories as well, such as the steering transducer, as described above.

This "plug" type connection could be any type of suitable electrical/data connection such as a pig tail, a pin connector, a plug-type connector or any type of connector that transmits electrical/data signals. As shown in FIG. 18, the connection could be provided by a pin-type connector 194 and the electrical interfaces could be covered by retractable covers 196 to keep them clean when they are not in use.

It will also be appreciated that the connector 95 need not necessarily be an electrical connector. Instead, the foot pedals 185/188 could be mechanically attached to the floor at multiple attachment points, such as by a snap-in connector or could even be magnetically attached to the floor at any location. These connections could be instead of or in addition to the electrical connection to add strength to the foot pedals 185/188. Also, the foot pedals 185/188 could be adjustable within the vehicle by using a hydraulic movement system or a motor and linkage arrangement in addition to the electrical connection. The hydraulic arrangement would give more of a feel of the prior art pedals. For example, the adjustable foot pedal arrangement 222, 260 and 286 shown in FIGS. 19–24 could be used as either a foot rest or a throttle-by-wire accelerator pedal such as a brake-by-wire brake pedal 185.

Figure 19:
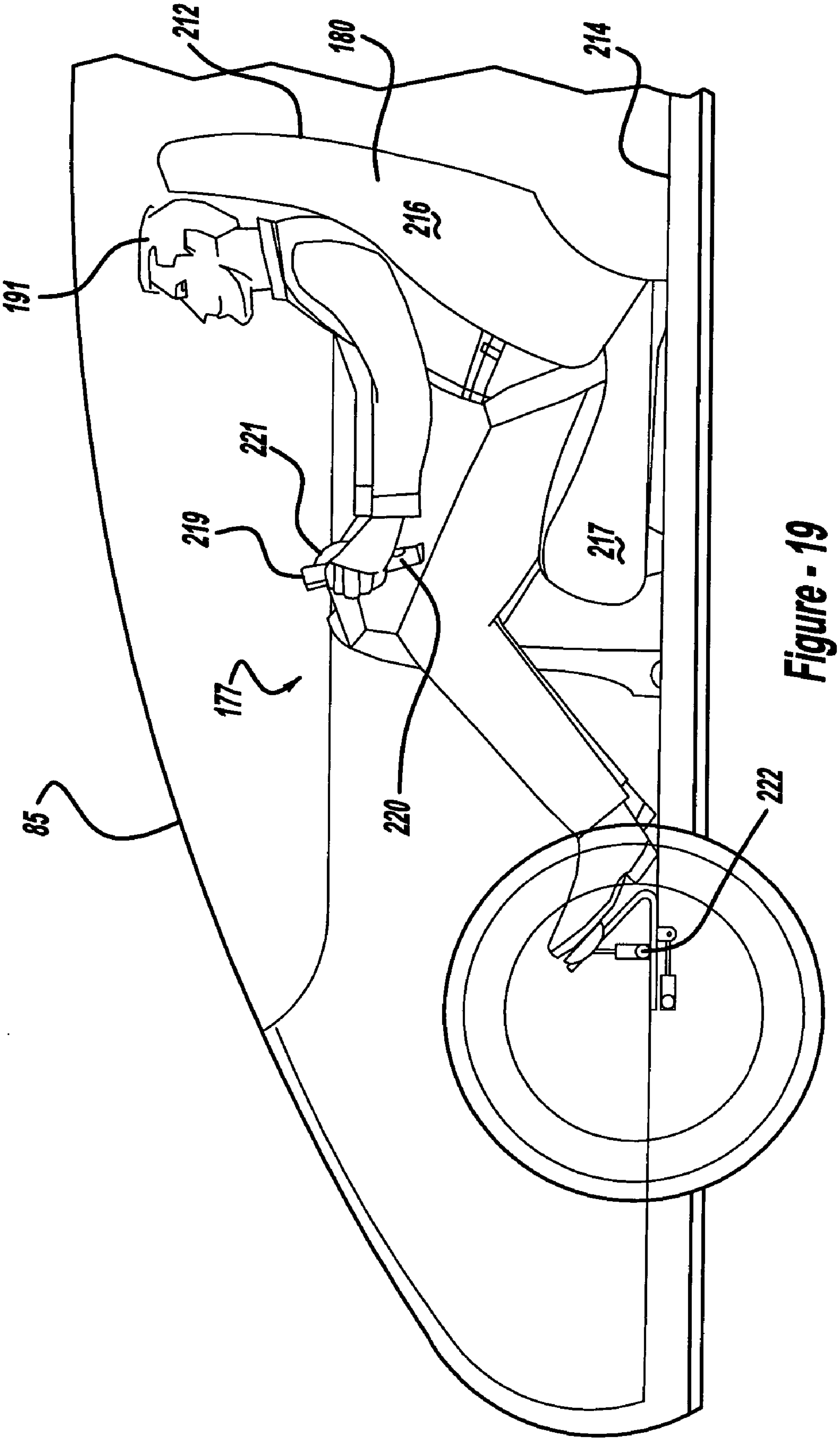
FIG. 19 is a fragmentary side elevational schematic view with parts broken away to show the interior of a vehicle having a driver's interface for complete by-wire hand control of the vehicle and a left side view of an adjustable foot rest for the convenience and comfort of the driver's feet.

FIG. 19 shows a vehicle body 85 having a seat 212 for occupant/driver 191 which is supported on a floorboard 214. The seat 212 may extend across the width of the vehicle to accommodate a passenger or a separate seat may be located beside the seat 212. The vehicle has a driver-operable control input device 177 (see also FIG. 7) which includes a control module 219 having a steering grip portion 220 and an information display portion 221. The seat 180 has a backrest 216 and a seat cushion 217. The seat cushion may be fixed with respect to the floorboard 214 or the seat may be adjustable up and down and back and forth. The adjustable foot rest 222 of this invention is in front of the seat cushion 217 of the seat and/or seats. The foot rest 222 is slidable back and forth in a track on the floorboard or it can be attached to the seat and slide back and forth with respect to the seat. The foot rest 222 may also be removable from the vehicle or the vehicle seat or movable transversely side-to-side by a track arrangement 192 described hereinbefore.

Figure 20:
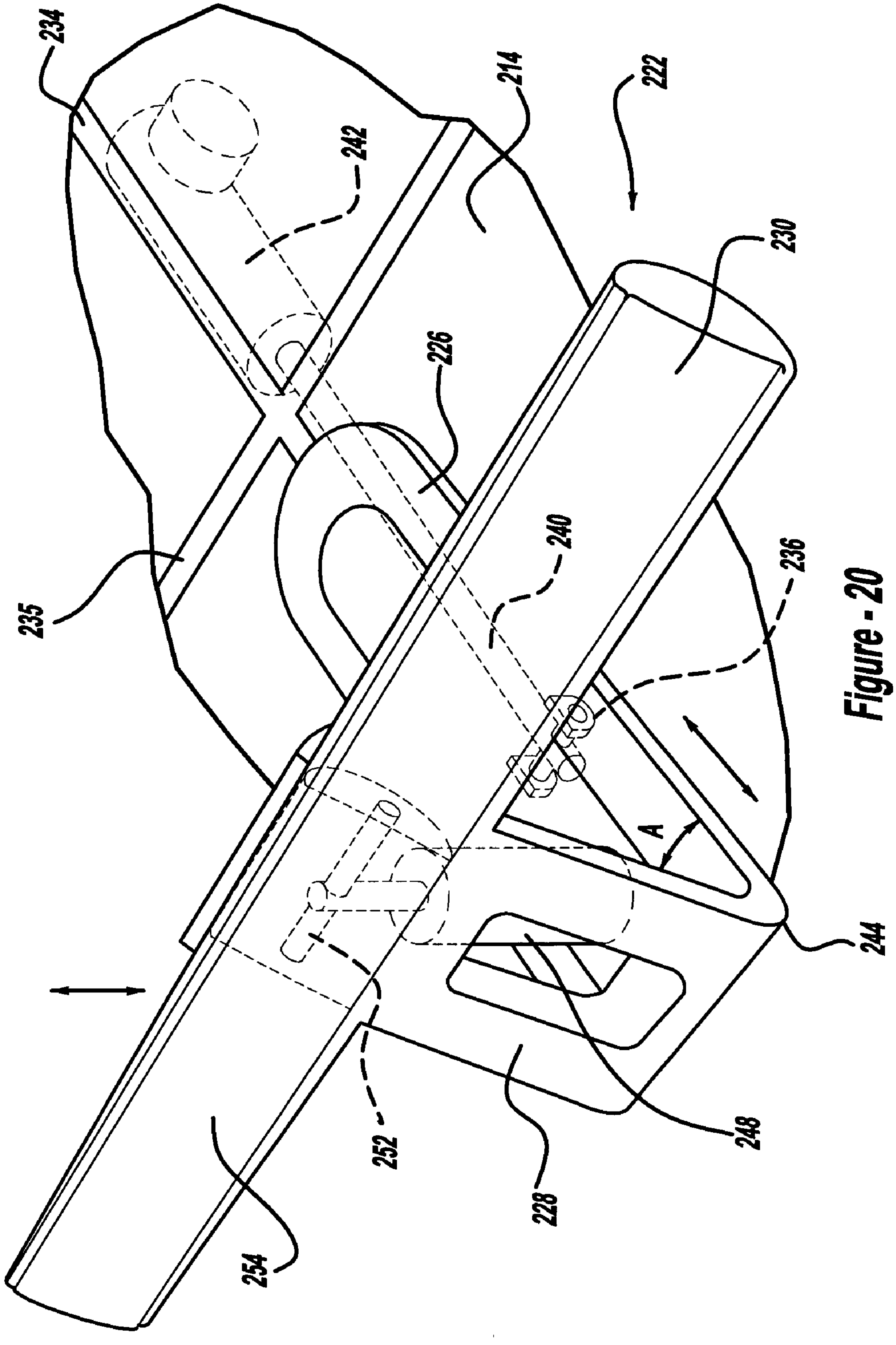
FIG. 20 is a fragmentary perspective view of the adjustable foot rest showing the beam, support post and base of this invention movably slidable in a track on or in the vehicle floor.

With reference to FIG. 20 the first embodiment of the adjustable foot rest 222 includes a base 226, a support post 228 and an elongated transverse foot rest beam 230. The floorboard 214 has a guide slot or track 234, 235 and the base has an affixed follower 236 in the guide slot which is slideable or translatable longitudinally (234) and transversely (235) with respect to the floorboard to move the foot rest in a manner closer to or farther from or along the seat 212 and any driver or passenger in the seat or seats. The follower 236 is connected to the arm 240 of an actuator or motor 242 operable in response to either electrical or hydraulic power.

Figure 23:
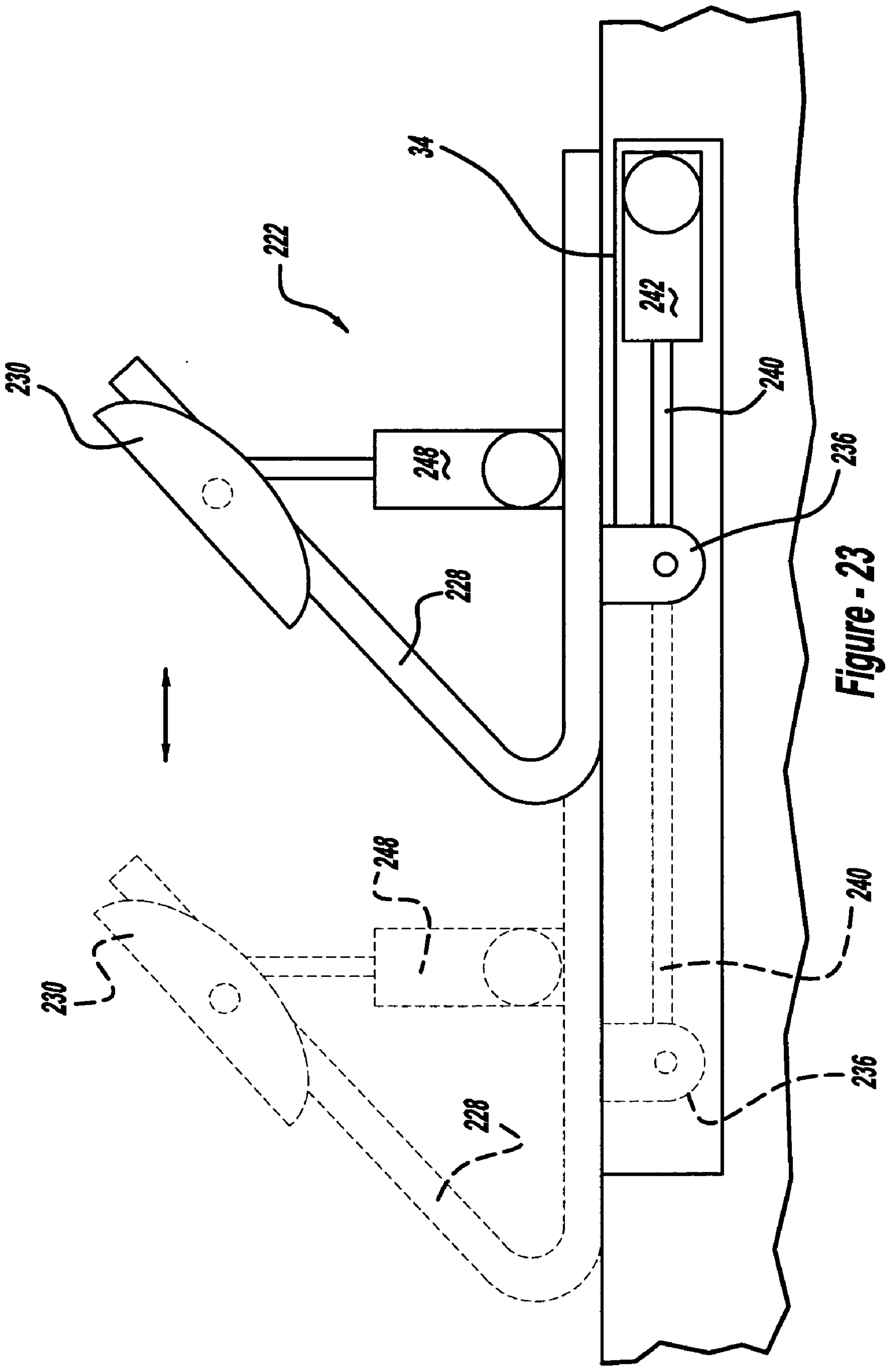
FIG. 23 is a right side elevational view of the first embodiment showing the support post of the foot rest longitudinally translatable in a track between a forward position farther from the driver or passenger seat (solid line) and a rearward position closer to the driver or passenger seat (phantom line)

More specifically for the first embodiment 222, turn now to FIG. 23 where the longitudinal adjustment of the foot rest 222 is shown. Actuator 242 has its arm 240 connected to the follower 236 of the foot rest. The actuator selectively operates to move or translate the foot rest 222 longitudinally from a first position (solid line) farther from the seat 12 and any driver or passenger in the seat to a second position (phantom line) closer to the seat and any driver or passenger in the seat. The actuator also operates selectively to move the foot rest to any position in between.

Figure 21:
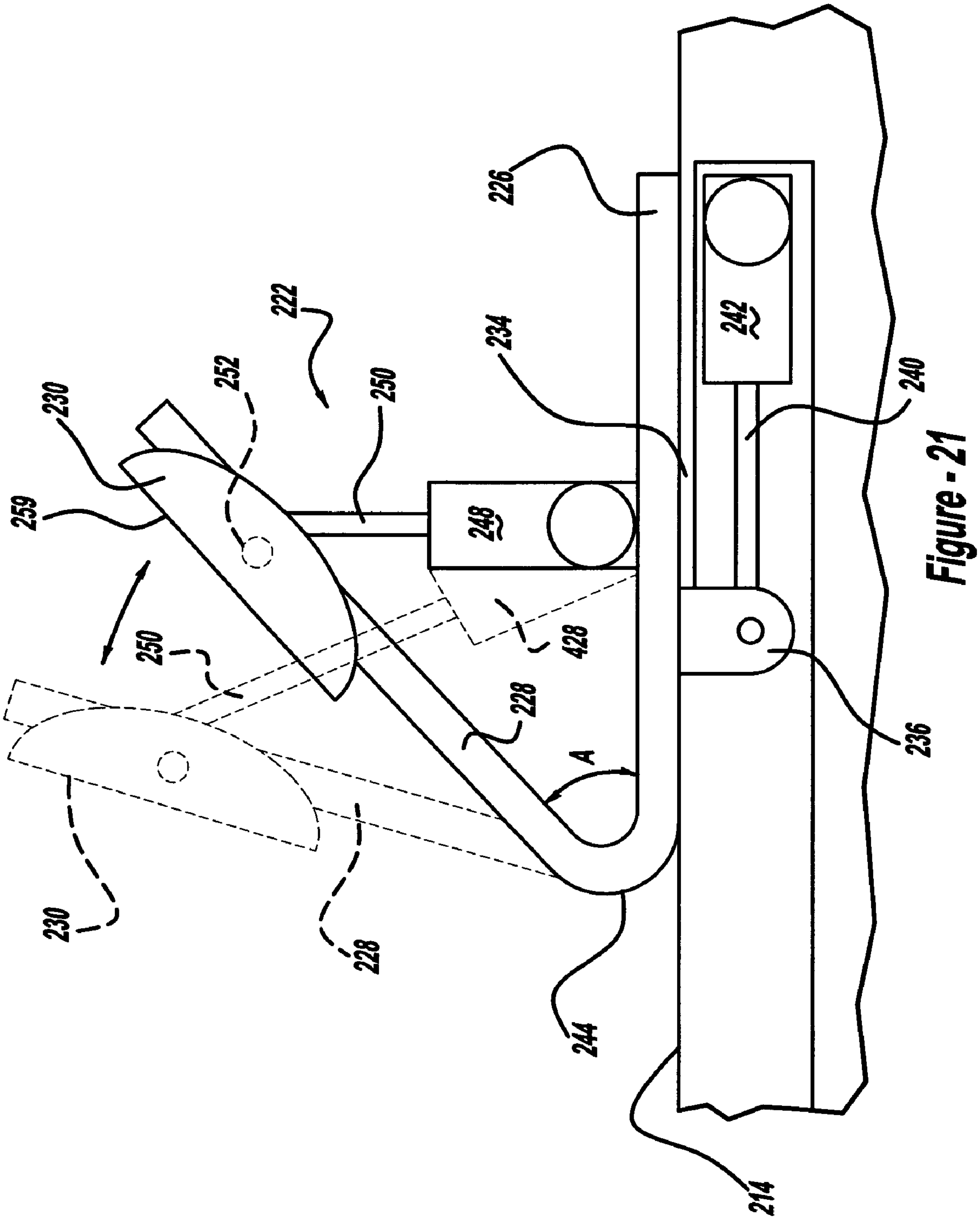
FIG. 21 is a right side elevational view of a first embodiment of the foot rest showing an integral support post and beam in a low angle position (solid line) and a higher angle position (phantom line)

With reference to FIGS. 20 and 21, the adjustable foot rest 222 is shown with the post 228 at an acute angle A with respect to the base 226. The apex 244 of this angle is either of a material sufficiently flexible to bend as shown or includes a hinge (not shown) between base and post. The post 228 in FIG. 21 is angularly moveable to adjust the foot rest 230 in a second manner between a lower position (solid line) farther from the seat 212 and any driver or passenger in the seat or a higher position (phantom line) closer to the seat 212. This adjustment is provided by an actuator or motor 248 having an arm 250 connected by a T-bar 252 to the post 228 or foot rest beam 230. The foot rest surface of beam 230 is moveable in response to the motor or actuator which is operable by either electrical or hydraulic power. Angle A could also be enlarged or reduced by an actuator (not shown) whereby to lower the foot rest 222 to the level of the floorboard 214 so as to clear the floorboard for carrying cargo or the like.

Figure 22:
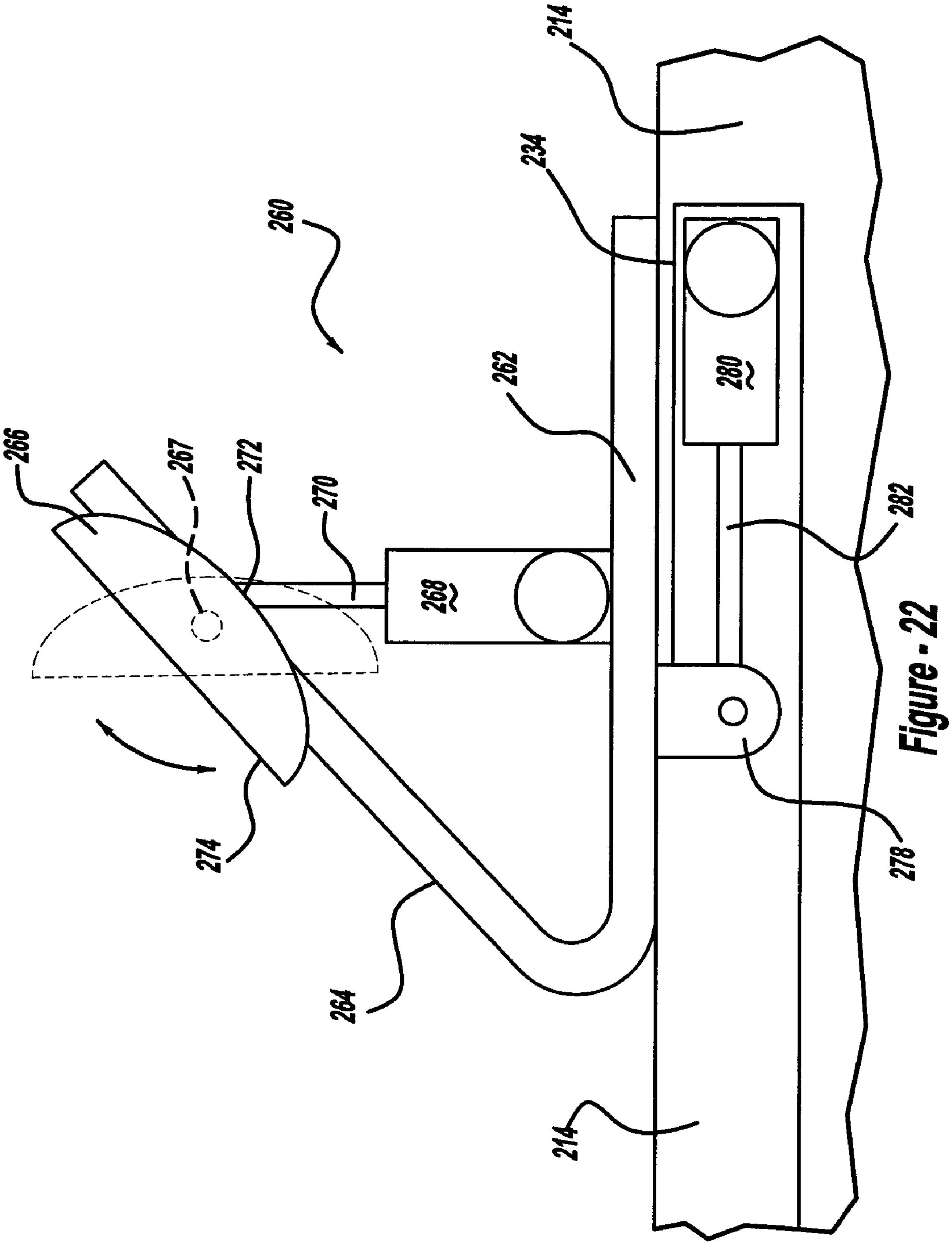
FIG. 22 is a right side elevational view of a second embodiment of this foot rest showing a relatively pivotable beam and support post with the foot rest surface of the beam substantially coplanar with the support post (solid line) and an upright position angled with respect to the support post (phantom line)

The second embodiment 260 of the adjustable foot rest is described with reference to FIG. 22. Adjustable foot rest 260 includes a base 262 having a support post 264 and an elongated transverse foot rest beam 266. The foot rest beam is pivotable with respect to the support post 264 about an axis 267. This pivotal action is provided by an actuator or motor 268 having an arm 270 connected to the beam 230 at an off-center location 272. The beam 266 has a foot rest surface 274 which is pivotally adjustable when the beam 266 pivots about axis 267. Thus, the surface 274 of adjustable foot rest 260 is moveable in a third manner between a first position (solid line) substantially coplanar with the support post 264 and a second position (phantom line) at an angle to the post 264. Actuator or motor 268 operates in response to either electrical or hydraulic power to pivot beam 266 to any position between the first and second positions. This adjustment operates to provide the most comfortable resting surface for the foot or leg. Adjustable foot rest 260 also includes a follower 278 in a guide slot or track 234 and an actuator or motor 280 with an arm 282 connected to the follower to move the adjustable foot rest 260 slideably or translatably longitudinally and transversely with respect to the floorboard 214 as before described for the first embodiment 222 of the foot rest in FIG. 20.

Figure 24:
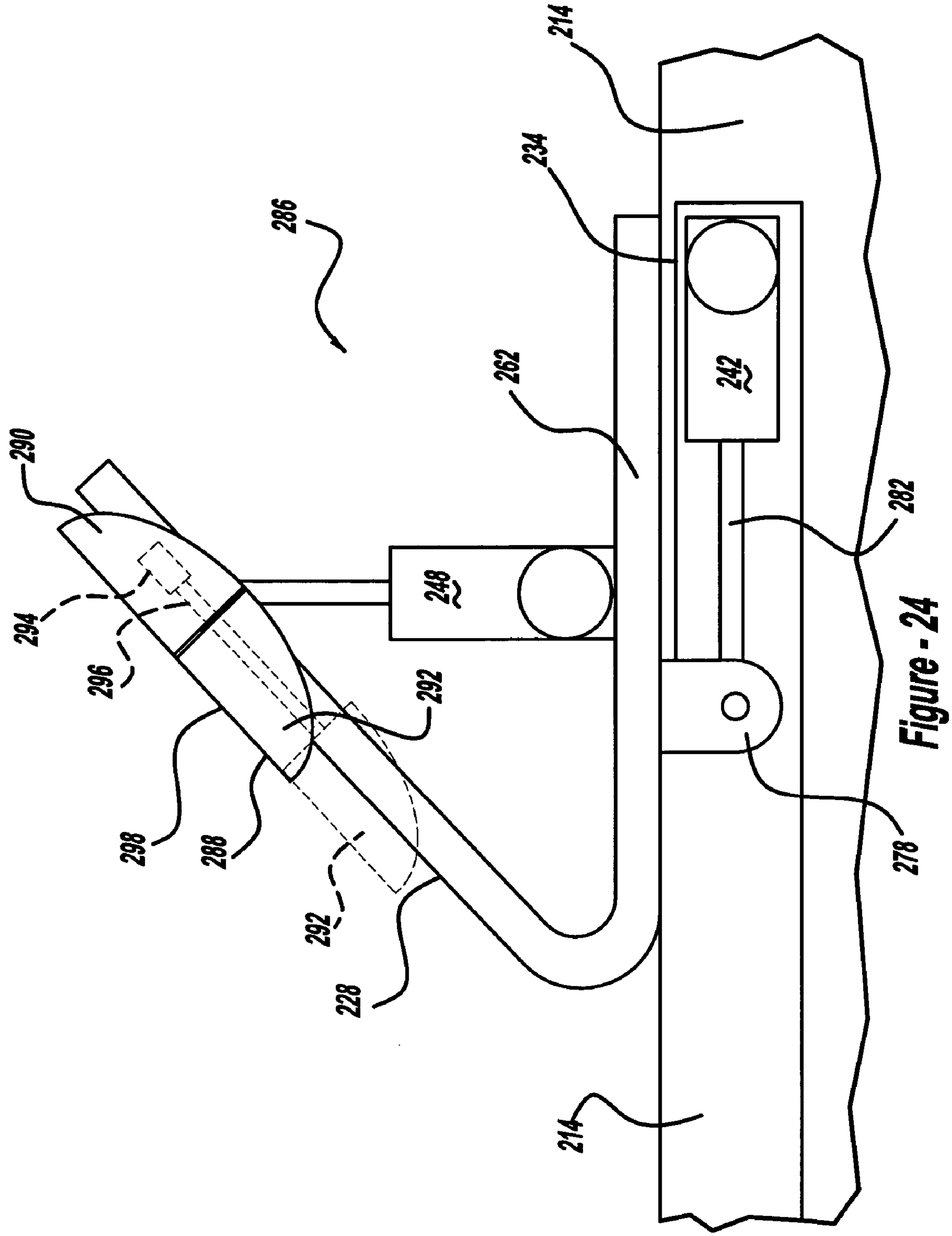
FIG. 24 is a right side elevational view of a third embodiment showing the transverse foot rest beam splittable to increase the surface area of the foot rest.

A third embodiment 286 is shown in FIG. 24. Foot rest 286, like foot rest 260, has a base 262 and a support post 228, and an actuator 280 for moving the foot rest longitudinally. However, foot rest 286, like foot rest 222, has an actuator 248 to change the angle of the support post 228 as in FIG. 21. Additionally, foot rest 286 has a transversely splittable beam 288 which includes an upper half portion 290 and a lower half portion 292. An actuator 294 in the upper half portion 290 has an arm 296 connected to the lower half portion 292. When the actuator extends the arm 296, the lower half portion of the beam moves away from the upper half portion to expand the surface area of the beam. The top surface 298 can be made continuous with telescoping parts on the two half portions of the beam.

The adjustable foot rest 222 can be modified in accordance with the description hereinbefore for foot pedals 185/188 so that the pedal is operable to either brake or accelerate. The foot rest 222 may also be provided with a track arrangement such as 235 and 234 in FIG. 20 so that the pedal can move transversely as well as longitudinally, whereby to accommodate the driver from various positions within the vehicle body.

As long as the foot pedals 185/188 have some internal or external power source, they can be moved around the vehicle. For example, the foot pedals 185/188 could have an internal battery mounted inside as the power source. A transducer within the pedal could send a wireless signal to the control units and actuators. The foot pedals 185/188 could also be attached magnetically to the floor.

While fairly traditional-looking pedals are shown, it will be appreciated that the pedals could be various shapes and sizes as long as they are a convenient device for pressing by the foot.

Typically, electrically conductive wires such as by-wire 179 are used in the preferred embodiment to transfer signals between the chassis 10 and an attached body 85, and between transducers, control units and actuators. As aforesaid, those skilled in the art will recognize that other non-mechanical means of sending and receiving signals between a body and a chassis, and between transducers, control units and actuators may be employed and fall within the scope of the claimed invention.

It will also be appreciated that foot pedals such as 185/188 could be connected to the vehicle seat and travel with a particular vehicle seat and use the electrical power connection coming through or under the seat.

While the by-wire foot pedals have been described with regard to the fuel cell vehicle having a generally flat rolling chassis 10, it will be appreciated that it is not limited thereto, but could be used in any by-wire vehicle, including those with a traditional internal combustion engine.

With reference to FIG. 7, it will also be appreciated that the driver control input device 177 having one or more of the controls, such as the steering transducer, the energy conversion system transducer and the braking transducer could be a unit that is integrated into either a console (FIG. 12) or a vehicle seat (FIG. 7). Thus, the entire driver control input unit as well as the seat could be popped into different seating locations in the vehicle and use a common interface point or electrical/data connector 95. These seat connection points, similar to 175 in FIG. 7, could be used to transmit power and signals for the steering system, braking system and energy conversion system as well as other such as the suspension system and the driver information center—speed, fuel supply, etc.—on a screen, driver entertainment center, phone, computer, etc. For security reasons, the seat/occupant control unit device 177 shown in FIG. 7 can be reconfigurable for certain uses (in addition to being a driver input control unit) such as when the vehicle is stopped to block the control unit so that children, for example, cannot drive the vehicle.

Also advantageously and with reference to FIG. 16, a combined or unitary seat and/or console and driver control input device unit 300, could be each sold separately to the consumer. The combined unit 300 would include a seat 302, driver control input device 304 (like 177). With this option, the consumer can customize the seat or console in their chosen vehicle to the desired functions and configurations that they would like for their lifestyle and passengers. For example as in FIG. 7, a family might have a couple of seats with an integral entertainment package and/or integral child seat, and one driver interface seat and another seat designed as a computer workstation unit. The seats 302 or consoles 200 or brake or accelerator pedals 185/188 can be popped in and out of the appropriate electrical interface connectors 91. Each seat combination 300 can be reconfigured electronically for the desired signals to be sent between the selected vehicle body and the chassis system. Such reconfiguration could include the entertainment system and/or driver comfort system and/or driver information system. In this manner, consumers can customize or upgrade their vehicle seats to include the options of their choice completely independent of the new vehicle body which they purchase.

It will be further appreciated that it would be possible to have a seat control device unit with the same or similar hardware for each vehicle seat. The computer screen 221 could then be a reconfigurable and programmable, such as by a menu driven process that selects the desired unit use for the driver operable control input device 177 (driver, entertainment, child, etc.) such that in one seat unit 300 the hand grips 301 are used as a steering transducer and in another vehicle seat they are reconfigured using software to be controls for a video game. The foot pedals 185/188 that travel with the seat may be removable from the seat/vehicle as desired.

While the best modes for carrying out the invention have been described in detail, those familiar with the art to which this invention relates will recognize various alternative designs and embodiments for practicing the invention within the scope of the appended claims.

The invention claimed is:

1. An adjustable pedal assembly in combination with a vehicle having a driver's seat having selectable multiple driving positions and a vehicle floorboard, said pedal assembly including:

a track arrangement in said vehicle floorboard extending longitudinally and transversely with respect to said vehicle, and one or more foot pedals movably mounted in said track arrangement for positioning said pedal or pedals with respect to said vehicle longitudinally and transversely along said track in accordance with the driving position selected; wherein said track arrangement includes a longitudinal track portion and a transverse track portion, and said one or more foot pedals includes a base movable forwardly and backwardly in the longitudinal track portion, and a post connected to the base and movable upwardly and downwardly with respect to the base, and a beam pivotally supported with respect to said base or said post; and wherein said beam is elongated transversely and splitable longitudinally.

2. The adjustable pedal assembly of claim 1 further comprising at least three wheels on the vehicle, and an energy conversion system operable for motivating at least one of said wheels to move the vehicle, and wherein at least one of the one or more foot pedals is actuable by-wire to selectively operate said energy conversion system.

3. A foot pedal for use with a seat of a vehicle and comprising:

a base moveable forwardly and backwardly;

a post connected to the base and moveable upwardly and downwardly with respect to the base;

a beam pivotally supported with respect to the base and/or the post;

a first actuator connected to the base for moving the base;

a second actuator connected to the post and/or beam for pivoting the beam; and a third actuator connected to the beam for expanding the surface area of the beam.

4. The foot pedal of claim 3 wherein the base is further movable from side to side.

5. The foot pedal of claim 4 wherein the base is moveable on a track in the vehicle.

6. The foot pedal of claim 3 wherein the pivoting of the beam is part of an energy conversion system or braking system for the vehicle.

7. A by-wire foot pedal system for a vehicle having a plurality of different driving locations, wherein at least one foot pedal is removably mounted in a vehicle floorboard for reconfiguration of the driving location, wherein the vehicle includes a plurality of driver interface points defining the different driving locations and at which the foot pedal is connectable.

* * * * *